United States Patent
Kato

[19]

[11] Patent Number: 5,901,218
[45] Date of Patent: * May 4, 1999

[54] TELEPHONE SET CAPABLE OF INITIATING FACSIMILE COMMUNICATION WITHOUT DISTINCTIVE RINGING UPON RECEPTION OF FACSIMILE CALL SIGNAL

[75] Inventor: Tokunori Kato, Ichinomiya, Japan

[73] Assignee: Brother Kogyo Kabushiki Kaisha, Nagoya, Japan

[ * ] Notice: This patent is subject to a terminal disclaimer.

[21] Appl. No.: 08/843,662

[22] Filed: Apr. 9, 1997

Related U.S. Application Data

[62] Division of application No. 08/348,965, Nov. 28, 1994, Pat. No. 5,673,313.

[30] Foreign Application Priority Data

Dec. 7, 1993 [JP] Japan .................................... 5-306901
Dec. 7, 1993 [JP] Japan .................................... 5-306903

[51] Int. Cl.[6] .................................................. H04M 3/02
[52] U.S. Cl. ........................................ 379/373; 379/90.01
[58] Field of Search .................................. 379/67, 70, 82, 379/88, 89, 90.01, 93.01, 100.01, 102.02, 142, 156, 164, 167, 170, 172, 173, 174, 179, 181, 182, 183, 187, 251, 252, 350, 352, 354, 372, 373, 374, 375, 376, 418, 67.1; 358/400, 401, 402

[56] References Cited

U.S. PATENT DOCUMENTS 3,689,705 9/1972 Pinede et al. .
3,928,732 12/1975 Simon et al. .
3,946,146 3/1976 Brown et al. .

(List continued on next page.)

FOREIGN PATENT DOCUMENTS 55-149798 5/1982 Japan .
57-073554 5/1982 Japan .
57-184357 11/1982 Japan .
59-049050 3/1984 Japan .
60-196057 10/1985 Japan .
61-287361 12/1986 Japan .
63-007060 1/1988 Japan .
63-104550 5/1988 Japan .
63-157551 6/1988 Japan .
63-256038 10/1988 Japan .
63-258143 10/1988 Japan .
63-268338 11/1988 Japan .

OTHER PUBLICATIONS

"Dialing for Dollars", *The Washington Post*, Washington Business, Jan. 15, 1990, p. 3, [379/373].

"Speech–Synthesis Telephone Call Annunciator", *IBM Technical Disclosure Bulletin*, vol. 31, No. 8, Jan. 1989, pp. 261–264.

*Primary Examiner*—Krista Zele
*Assistant Examiner*—Scott L. Weaver
*Attorney, Agent, or Firm*—Oliff & Berridge, PLC

[57] ABSTRACT

A telephone set incorporated in a facsimile system using two or more telephone numbers called by respective call signals having different patterns, which are stored in a pattern data memory when the call signals are received and detected in a registering mode and with which the pattern of a call signal received when the telephone set is not in the registering mode is compared to determine the telephone number being called. The registering mode is established by an operator-controlled mode setting device. The patterns of the call signals are detected by a pattern detector in the registering mode, and the detected patterns are registered in the pattern data memory, so that the telephone number called by each call signal is determined by a pattern determining device as a result of comparison of the pattern of each call signal with the registered patterns in the pattern data memory. A selective call signal processing device is operated upon reception of a facsimile call signal in a distinctive ringing ON mode also established by the data input device, so that facsimile communication is initiated without distinctive ringing based on the facsimile call signal.

6 Claims, 17 Drawing Sheets

U.S. PATENT DOCUMENTS

| | | |
|---|---|---|
| 4,192,007 | 3/1980 | Becker . |
| 4,282,410 | 8/1981 | Gauthier et al. . |
| 4,477,697 | 10/1984 | Judd et al. . |
| 4,578,540 | 3/1986 | Borg et al. . |
| 4,646,347 | 2/1987 | Liu . |
| 4,677,660 | 6/1987 | Yoshida . |
| 4,720,848 | 1/1988 | Akiyama . |
| 4,782,518 | 11/1988 | Mattley et al. . |
| 4,802,202 | 1/1989 | Takahashi et al. . |
| 4,850,012 | 7/1989 | Mehta et al. . |
| 4,995,075 | 2/1991 | Angiolillo-Bent et al. . |
| 4,998,273 | 3/1991 | Nichols . |
| 5,040,209 | 8/1991 | Greenburg et al. . |
| 5,073,922 | 12/1991 | Okada . |
| 5,086,458 | 2/1992 | Bowen . |
| 5,119,418 | 6/1992 | Dupillier . |
| 5,142,569 | 8/1992 | Peters et al. . |
| 5,200,992 | 4/1993 | Yoshino . |
| 5,200,994 | 4/1993 | Sasano et al. . |
| 5,253,289 | 10/1993 | Tanaka . |
| 5,299,256 | 3/1994 | Hu . |
| 5,307,059 | 4/1994 | Connary et al. . |
| 5,309,434 | 5/1994 | Maekawa . |
| 5,323,451 | 6/1994 | Yatsunami ................................ 379/100 |
| 5,333,190 | 7/1994 | Eyster . |
| 5,357,562 | 10/1994 | Metser et al. . |
| 5,361,296 | 11/1994 | Reyes et al. ................................ 379/96 |
| 5,371,781 | 12/1994 | Ardon ........................................ 379/59 |
| 5,425,089 | 6/1995 | Chan et al. . |
| 5,428,673 | 6/1995 | Nakagawa et al. . |
| 5,432,844 | 7/1995 | Core et al. . |
| 5,442,463 | 8/1995 | Ohnishi et al. . |
| 5,442,692 | 8/1995 | Yamazaki et al. . |
| 5,446,784 | 8/1995 | MacTaggart . |
| 5,452,346 | 9/1995 | Miyamoto . |
| 5,452,354 | 9/1995 | Kyronlahti et al. . |
| 5,471,522 | 11/1995 | Sells et al. . |
| 5,481,599 | 1/1996 | MacAllister et al. . |
| 5,485,508 | 1/1996 | Ho . |
| 5,490,210 | 2/1996 | Sasso . |
| 5,563,932 | 10/1996 | Tachibana et al. . |

FOREIGN PATENT DOCUMENTS

| | | |
|---|---|---|
| 63-278455 | 11/1988 | Japan . |
| 2-183659 | 7/1990 | Japan . |
| 2-218249 | 8/1990 | Japan . |
| 2-303251 | 12/1990 | Japan . |
| 4-48855 | 2/1992 | Japan . |
| 5-110635 | 4/1993 | Japan . |
| 5-153227 | 6/1993 | Japan . |
| 2193419 | 2/1988 | United Kingdom . |
| WO 91/12685 | 8/1991 | WIPO . |

| MAIN ITEMS | SUB-ITEMS |
|---|---|
| 1. TEMP SETTING | 1. TIMER<br>2. POLLING<br>⋮ |
| 2. CANCEL JOB | N / A |
| 3. PRINT REPORT | 1. ACT REPORT<br>2. ALL DIAL<br>⋮ |
| 6. TEL OPTION | 1. TONE / PULSE<br>2. RING DELAY<br>⋮<br>7. DISTINCTIVE<br>8. RING MESSAGE |
| 7. SETUP SYSTEM | 1. DATE / TIME |

FIG. 3

EEPROM 70

| REGISTRATION NO. 0: FACSIMILE RECEPTION CALL SIGNAL PATTERN |
| --- |
| REGISTRATION NO. 1: OTHER CALL SIGNAL PATTERN |
| REGISTRATION NO. 2: OTHER CALL SIGNAL PATTERN |
| REGISTRATION NO. 3: OTHER CALL SIGNAL PATTERN |

70

AUDIO DRAM 72

| OUTGOING MESSAGE |
| --- |
| MEMORANDUM MESSAGE |
| INCOMING MESSAGE |
| CALL MESSAGE |
| REGISTRATION NO. 1 |
| REGISTRATION NO. 2 |
| REGISTRATION NO. 3 |

| REGISTRATION NUMBER | EEPROM 32 | AUDIO DRAM 34 |
|---|---|---|
| 0 | CALL SIGNAL PATTERN FOR TEL. NO. 1111 (FOR FACSIMILE RECEPTION | — |
| 1 | CALL SIGNAL PATTERN FOR TEL. NO. 2222 | "MR. A, YOU HAVE A PHONE CALL." |
| 2 | CALL SIGNAL PATTERN FOR TEL. NO. 3333 | "MR. B, YOU HAVE A PHONE CALL." |

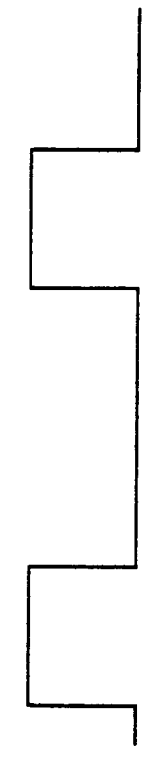
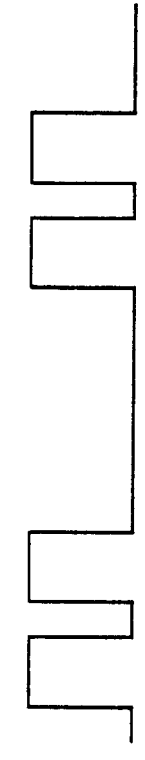
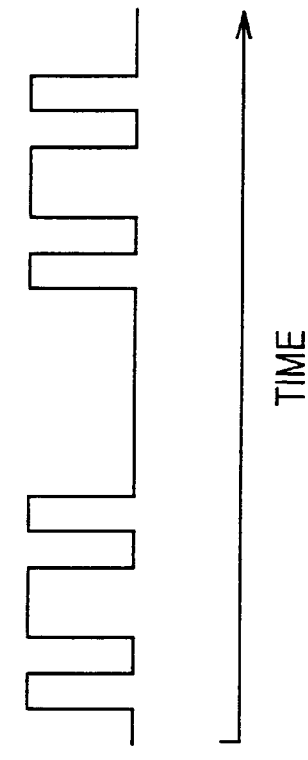
FIG. 17(a) PRIOR ART
FIG. 17(b) PRIOR ART
FIG. 17(c) PRIOR ART
FIG. 17(d) PRIOR ART

TELEPHONE SET CAPABLE OF INITIATING FACSIMILE COMMUNICATION WITHOUT DISTINCTIVE RINGING UPON RECEPTION OF FACSIMILE CALL SIGNAL

This is a Division of application Ser. No. 08/348,965 filed Nov. 28, 1994 now U.S. Pat. No. 5,673,313.

BACKGROUND OF THE INVENTION

1. Field of the Invention

The present invention relates in general to a telephone set (a combination of a telephone transmitter and a telephone receiver) adapted to receive two or more call signals having different patterns which call respective telephone numbers. More particularly, the present invention is concerned with improvements in such telephone set wherein the patterns of such call signals are registered in relation to the telephone numbers, so that the telephone number called by each call signal received from a calling party can be recognized by the telephone set of a called party.

2. Discussion of the Related Art

There is known a telephone set adapted to utilize a so-called "distinctive ringing service (D/R service)" available from a telephone exchange company. This telephone set of distinctive ringing type uses two or more telephone numbers on one telephone line. The distinctive ringing service provides the telephone set with telephone call signals which have different patterns as illustrated at (a) through (d) in FIG. 17, when the respective telephone numbers are called by a remote telephone transmitter of the calling party, so that the ringing device of the facsimile system of the receiving or called party generates different types of ringing sound depending upon the telephone numbers called.

Where such a telephone set of distinctive ringing type is incorporated as a telephone portion of a facsimile system, one of the telephone numbers is used exclusively for facsimile communication with a facsimile portion of a remote facsimile system, while the other telephone number or numbers is/are exclusively used for telephone communication with a telephone portion of the remote facsimile system. The telephone number called by the remote facsimile system of the calling party can be recognized by the specific type of the ringing sound generated according to the specific pattern of the appropriate call signal received at the called party. Alternatively, one or more telephone sets of distinctive ringing type connected to one telephone line can be effectively used by two or more users to which respective different telephone numbers are assigned.

One proposed telephone set of distinctive ringing type includes memory means for storing the patterns of the call signals corresponding to the respective telephone numbers, comparing means for comparing the pattern of each received call signal with the stored patterns, pattern determining means for determining the telephone number called by the received call signal, on the basis of a comparison by the comparing means, and processing means for effecting a processing operation according to the telephone number determined by the pattern determining means. Where this telephone set is used in a facsimile system wherein one of the telephone numbers is assigned to receive a facsimile signal from the calling party, for example, the pattern of the call signal corresponding to that facsimile reception telephone number is registered or stored in memory means as the facsimile reception pattern, so that the facsimile signal received with the call signal is automatically processed for recording of an image represented by the facsimile signal, when the pattern of the received call signal is the same as the registered facsimile reception pattern. An example of such facsimile system is disclosed in JP-A-4-58855.

The facsimile reception pattern of the call signal calling the facsimile reception telephone number is registered by the user by listening to the ringing sound generated according to that received call signal. For example, a plurality of telephone numbers used for a telephone set of distinctive ringing type are called by call signals which have different patterns as indicated at (a) through (d) in FIG. 17. One of these patterns is selected and registered as the facsimile reception call signal pattern. The call signal indicated at (a) has only one ON state per period. The call signal indicated at (b) has two ON states per period. The call signal indicated (c) has three ON states per period, which consist of a first short ON-time, a second short ON-time and a third long ON-time. The call signal indicated at (d) has three ON states per period, which consist of a first short ON-time, a second long ON-time and a third short ON-time. To register one of these call signal patterns as the facsimile reception pattern, the following method is considered. That is, all of these patterns are first stored in memory means, and the call signal calling the facsimile reception telephone number is received from a telephone exchange company upon calling from a remote telephone or facsimile transmitter as the calling party. The user of the telephone set of the called party recognizes the pattern of the received signal by listening to the ringing sound generated according to the ON-OFF pattern of the received call signal, and selects the corresponding one of the stored call signal patterns as the facsimile reception pattern. This way of registering the facsimile reception pattern requires the user to simply select one of the stored patterns which corresponds to the type of the ringing sound generated upon reception of the call signal calling the facsimile reception telephone number.

However, it is difficult for the user to correctly distinguish the pattern of the received call signal (facsimile reception call signal) from the patterns of the other call signals, by listening to the ringing sound corresponding to the received call signal. In the example of FIG. 17, it is rather difficult to distinguish the three-ON-state patterns indicated at (c) and (d) from each other, since both of these two patterns have three ON states. Accordingly, the user may incorrectly recognize the pattern of the received call signal and selects the wrong pattern as the facsimile reception pattern corresponding to the facsimile reception telephone number. Described more specifically, it is easier to distinguish the different patterns (c) and (d) from each other by listening to the ringing sounds corresponding to these different patterns, than by listening to the ringing sound corresponding to only one of these patterns. In other words, it is difficult for the user not familiar enough with the ringing sounds, to correctly recognize the pattern of the received call signal by simply listening to the ringing sound of the received call signal only. Some telephone exchange companies use two or more different two-ON-state call signals which have different combinations of ON-times and OFF-times and which may include the pattern as indicated at (b) in FIG. 17. In this case, too, the user feels difficulty in correctly recognizing the pattern of the call signal which is received for the purpose of registering the facsimile reception call signal pattern. Some users do not even know the patterns of the call signals.

SUMMARY OF THE INVENTION

It is therefore an object of the present invention to provide a telephone set of distinctive ringing type which permits easy and correct registration of the pattern of a call signal which calls one of telephone numbers used for the telephone set.

The above object may be achieved according to one aspect of the present invention, which provides a telephone set of distinctive ringing type of a called party capable of effecting telephone communication with a remote calling party calling one of a plurality of telephone numbers, the plurality of telephone numbers being called by respective call signals having respective different patterns, the telephone set comprising: (a) a pattern data memory for storing pattern data representative of the pattern of each of at least one of the call signals which call the plurality of telephone numbers; (b) operator-controlled means for establishing a registering mode in which the pattern data representative of the pattern of the at least one call signal are stored in the pattern data memory; (c) pattern detecting means for detecting the pattern of the at least one call signal when the at least one call signal is received while the telephone set is placed in the registering mode; (d) pattern registering means, operable in the registering mode, for registering the pattern of the at least one call signal as detected by the pattern detecting means, in the pattern data memory as the pattern data in relation to the corresponding telephone number; and (e) pattern determining means, operable when the telephone set is not placed in the registering mode, for comparing the pattern of a call signal which is currently received, with each pattern represented by the pattern data stored in the pattern data memory, and thereby determining the telephone number being called by the received call signal.

In the telephone set of the present invention constructed as described above, the pattern of each of at least one call signal calling at least one telephone number is detected by the pattern detecting means while the telephone set is placed in the registering mode established by the operator-controlled means. In this mode, the detected pattern of the call signal in question is registered in the pattern data memory by the pattern registering means, in relation to the corresponding telephone number. Namely, the call signal corresponding to each telephone number to be determined by the pattern determining means when the telephone set is placed in the normal telephone communication mode is sent from a telephone exchange company, when the telephone set is placed in the registering mode, and the pattern of each call signal received in the registering mode is detected or analyzed by the pattern detecting means, so that the detected pattern of the call signal is registered in the pattern data memory by the pattern registering means. Where the telephone set is incorporated in a facsimile system of distinctive ringing type, the call signal calling the facsimile reception telephone number is received from the telephone exchange company, and the pattern of this call signal is registered as the facsimile reception pattern in the pattern data memory.

The present telephone set is conveniently used by two or more users which use respective telephone numbers on the same telephone set. In this case, the telephone numbers being called by the respective call signals can be determined by the pattern determining means on the basis of the pattern of each received call signal as compared with the patterns of the individual call signals of the respective patterns registered or stored in the pattern data memory. The patterns of the call signals registered in the pattern data memory are detected by the pattern detecting means when the call signals are received in the registering mode.

Thus, the present telephone set is characterized by the pattern detecting means which actually detects or analyzes the pattern of each call signal to be registered in the pattern data memory, so that the detected pattern is registered in the pattern data memory by the pattern registering means. This arrangement does not requires the user or users to determine or recognize the pattern of the received call signal by listening to the ringing sound generated according to the call signal.

Where the telephone set is incorporated in a facsimile system, the pattern data memory may store pattern data representative of the pattern of the call signal which calls one of the telephone numbers which is exclusively used for receiving a facsimile signal.

Where two or more telephone numbers of the telephone numbers used by the telephone set are exclusively used by different users, respectively, the pattern data memory preferably store pattern data representative of the patterns of the call signals which call the telephone numbers used by the respective users, and the pattern registering means preferably comprise operator-controlled data input means for designating the telephone numbers. In this case, the telephone set desirably comprises: a message data memory for storing message data representative of call messages in relation to the call signals which call the two or more telephone numbers; message recording means for storing the message data in the message data memory while the telephone set is placed in the registering mode; message generating means, operable when the telephone set is not placed in the registering mode, for generating the call messages according to the message data stored in the message data memory; and activating means, operable when the telephone set is not placed in the registering mode, for activating the message generating means to generate one of the call messages which corresponds to the telephone number which has been determined by the pattern determining means as the telephone number being called by the call signal currently received.

The message data memory may be a suitable audio memory medium such as an audio DRAM, and the message generating means may be a suitable voice generator. The message recording means may be a microphone provided in a telephone transmitter of the telephone set.

The pattern detecting means may be adapted to measure the times of alternate on- and off-states in one period of each call signal whose pattern is registered in the pattern data memory.

The object indicated above may also be achieved according to a second aspect of this invention, which provides a telephone set of distinctive ringing type of a called party capable of effecting telephone and communication with a remote calling party calling one of a plurality of telephone numbers, the plurality of telephone numbers being called by respective call signals having respective different patterns, the telephone set comprising: (i) a first pattern data memory for storing pattern data representative of the patterns of the call signals which call the plurality of telephone numbers; (ii) a second pattern data memory for storing the pattern data representative of the pattern of each of at least one of the call signals, which pattern data are used to determine the telephone number being called by a call signal which is currently received; (iii) operator-controlled mode setting means for establishing a registering mode in which the pattern data representative of the call signal pattern or in patterns are stored in the second pattern data memory; (iv) operator-controlled data input means, operable in the registering mode, for designating one of the patterns stored in the first pattern data memory; (v) pattern registering means, operable in the registering mode, for registering the pattern designated by the operator-controlled data input means, in the second pattern data memory in relation to the corresponding telephone number; (vi) pattern indicating means, operable in the registering mode, for providing an indication of at least one of the patterns of the call signals stored in the first pattern data memory; and (vii) pattern determining means, operable when the telephone set is not placed in the registering mode, for comparing the pattern of the currently received call signal with each pattern represented by the pattern data stored in the second pattern data memory, and thereby determining the telephone number being called by the actually received call signal.

In the telephone set constructed according to the second aspect of the present invention, the pattern indicating means provides an indication of at least one of the patterns of the call signals stored in the first pattern data memory, when the telephone set is placed in the registering mode by the operator-controlled mode setting means. The indication provided by the pattern indicating means is conveniently used by the user to register in the second pattern data memory the pattern of at least one of the call signals corresponding to the telephone numbers used for the telephone set, for example, the pattern of the facsimile reception call signal which calls the telephone number exclusively used for receiving a facsimile signal from the remote calling party.

For example, the pattern indicating means may be sound generating means for generating a ringing sound corresponding to the pattern or patterns of the call signal or signals stored in the first pattern data memory, recording means for producing a hard copy of the call signal pattern or patterns, or display means for providing an indication specifying the call signal pattern or patterns. The sound generating means may be a speaker provided in a facsimile system in which the present telephone set is incorporated. The recording means may be an image recorder used by a facsimile receiver provided such a facsimile system, and the display means may be a liquid crystal display provided such facsimile system.

Generally, the call signal whose pattern is registered in the second pattern data memory is received from a telephone exchange company upon calling from a remote telephone transmitter or a facsimile transmitter for the purpose of registering the pattern of that call signal, while the telephone set is placed in the registering mode. In the meantime, one of the call signal patterns stored in the first pattern data memory is selected or designated by the operator-controlled data input means, so that the pattern indicating means provides an indication of the designated call signal pattern such as the corresponding ringing sound or a printout of the pattern. The thus indicated call signal pattern is compared with the pattern of the received call signal, which is preferably represented by suitable means such as a ringing sound generated by suitable sound generating means according to the received call signal. This sound generating means may be utilized as the pattern indicating means. In this case, the sound generating means generates the ringing sound according to the received call signal and the ringing sound or sounds according to the call signal or signals stored in the first pattern data memory.

When the pattern of the call signal received in the registering mode is found to be the same as the pattern of the call signal which is stored in the first pattern data memory and which is designated by the operator-controlled data input means, the pattern registering means is activated to register the pattern of the designated call signal in the second pattern data memory.

Where the present telephone set is incorporated in a facsimile system, the pattern of the call signal (facsimile reception call signal) which calls the telephone number exclusively used to receive a facsimile signal from a remote facsimile system is registered in the second pattern data memory, for example. The present telephone set is also advantageous where it is used by two or more users, which use respective telephone numbers on the telephone set. In this case, the patterns of the call signals calling the respective telephone numbers are registered in the second pattern data memory in relation to the corresponding telephone numbers. In this case, too, the respective call signals are sent from the telephone exchange company in response to calls from a remote facsimile transmitter while the telephone set is in the registering mode, for the purpose of registering the patterns of the call signals assigned to call the telephone numbers.

Preferably, the pattern indicating means indicates the on and off times of the call signal pattern or patterns stored in the first pattern data memory, which are desirably compared by the user with the pattern of the ringing sound generated according to the actually received call signal when the call signal pattern or patterns is/are registered in the second pattern data memory by means of the pattern registering means. When the two or more call pattern signals are registered, the pattern registering means preferably comprises operator-controlled means for specifying or designating the telephone numbers corresponding to the call signal patterns to be registered, so that the call signal patterns are registered in relation to the corresponding telephone numbers.

It will be understood that the pattern indicating means provided according to the second aspect of the invention permits easy and accurate registration of the pattern or patterns of the call signal or signals for determining the telephone number being currently called by a call signal actually received from the calling party during normal reception mode of the telephone set.

BRIEF DESCRIPTION OF THE DRAWINGS

The above and other objects, features and advantages of this invention will be better understood by reading the following detailed description of presently preferred embodiments of the invention, when considered in connection with the accompanying drawings, in which:

FIG. 3 is a view indicating some of functions that can be set by FUNCTION and SELECTOR keys on the control and display panel of FIG. 2;

FIG. 10 is a view indicating examples of the contents of the memory areas of the EEPROM and audio DRAM of FIGS. 9(a) and 9(b);

FIGS. 17(a)–17(d) are a view showing examples of call signals having different patterns.

DETAILED DESCRIPTION OF THE PREFERRED EMBODIMENTS

Figure 1:
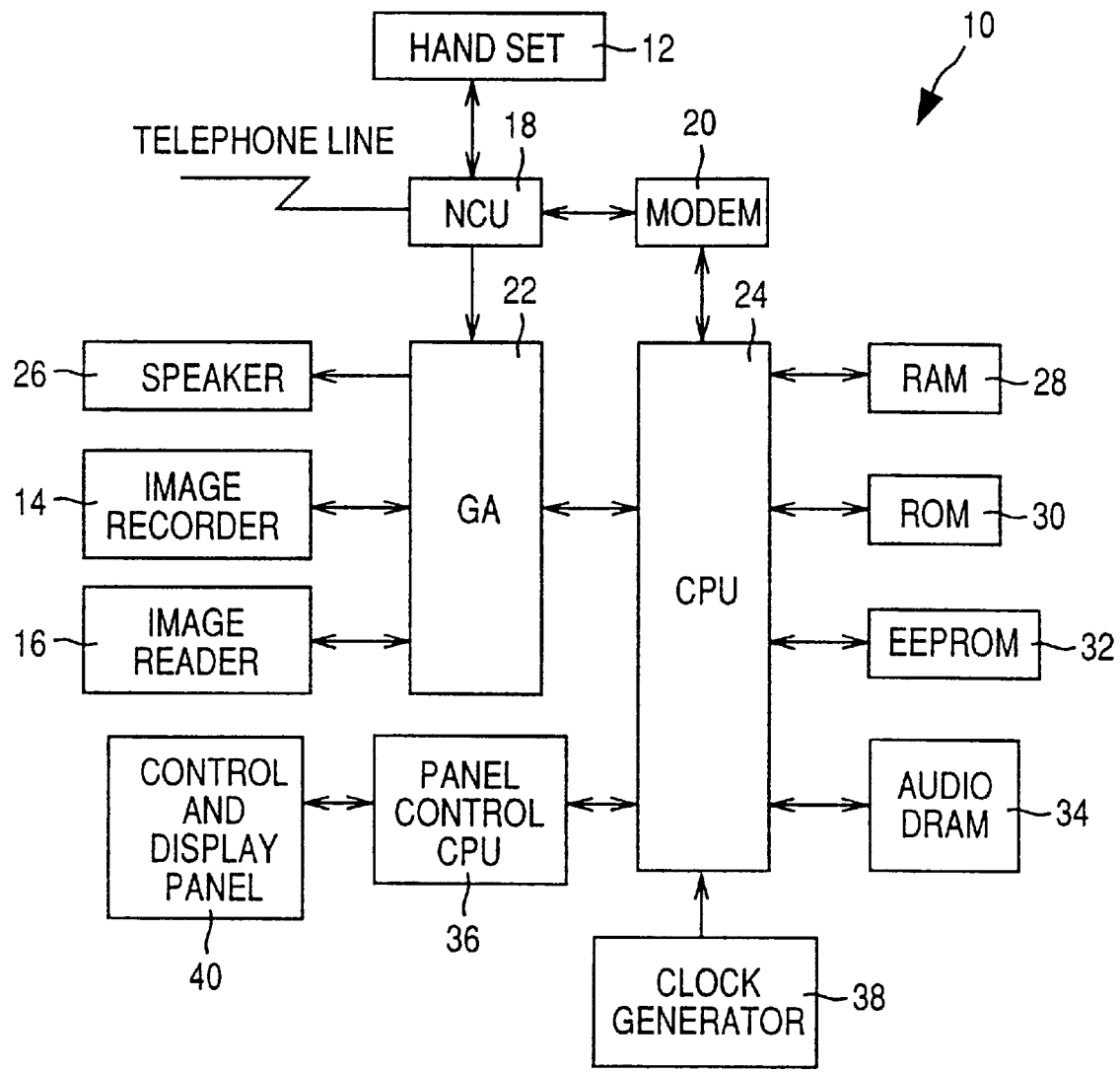
FIG. 1 is a block diagram showing a facsimile system of distinctive ringing type constructed according to one embodiment of the present invention.

Referring first to the block diagram of FIG. 1, reference numeral 10 generally denotes a facsimile system constructed according to one embodiment of this invention. The facsimile system 10 is capable of performing selective telephone communication and facsimile communication with a remote facsimile system through a telephone line, more precisely, capable of transmitting and receiving a telephone or sound signal and a facsimile or image signal to and from the remote facsimile system. The facsimile system 10 incorporates: a telephone hand set 12 for the telephone communication; an image recorder 14 including a printer for recording an image on a recording medium on the basis of a facsimile signal received from the remote facsimile transmitter; and an image reader 16 including a CCD (charge-coupled device) image sensor or scanner. A telephone line connected to a telephone exchange company is connected to a network control unit (NCU) 18. This NCU 18 is connected to the hand set 12, a MODEM for modulating and demodulating an facsimile signal (image or picture signal), and a gate array (GA) 22. The GA 22 incorporates various logic circuits for performing respective functions, including: activating a speaker 26 according to a drive signal received from a central processing unit (CPU) 24; controlling the image reader 16; and transferring image data from the image reader 16 to the CPU 24. The GA 22 receives from the telephone line a call signal CI (calling indicator) and various other signals through the NCU 18, so that the speaker 26 is operated to generate a ringing sound according to ON and OFF states of the received call signal CI as indicated in FIG. 17 by way of example. The GA 22 is also adapted to detect the frequency of the received signals.

To the CPU 24, there are connected through respective data bus lines the MODEM 20 and GA 22 described above, a random-access memory (RAM) 28, a read-only memory (ROM) 30, an electrically erasable programmable read-only memory (EEPROM) 32, an audio DRAM 34, a panel control CPU 36 and a clock generator 38. The CPU 24 operates according to control programs stored in the ROM 30 while utilizing a temporary data storage function of the RAM 28. The CPU 24 receives a clock signal having a predetermined frequency from the clock generator 38. The EEPROM 32 is capable of storing data such that the stored data are electrically erasable as needed. The EEPROM 32 has a memory area for storing pattern data representative of a predetermined pattern of a facsimile reception call signal CI which is assigned to call a telephone number exclusively used for receiving a facsimile signal from a remote facsimile transmitter of a calling party. The audio DRAM 34 is used in a telephone answering mode (hereinafter referred to as "TAD mode") which is selected when the facsimile system is not attended by the user. The audio DRAM 34 has a memory area for storing an outgoing message (OGM) to be transmitted to a remote telephone receiver, and a memory area for storing an incoming message (ICM) received from a remote telephone transmitter.

Figure 2:
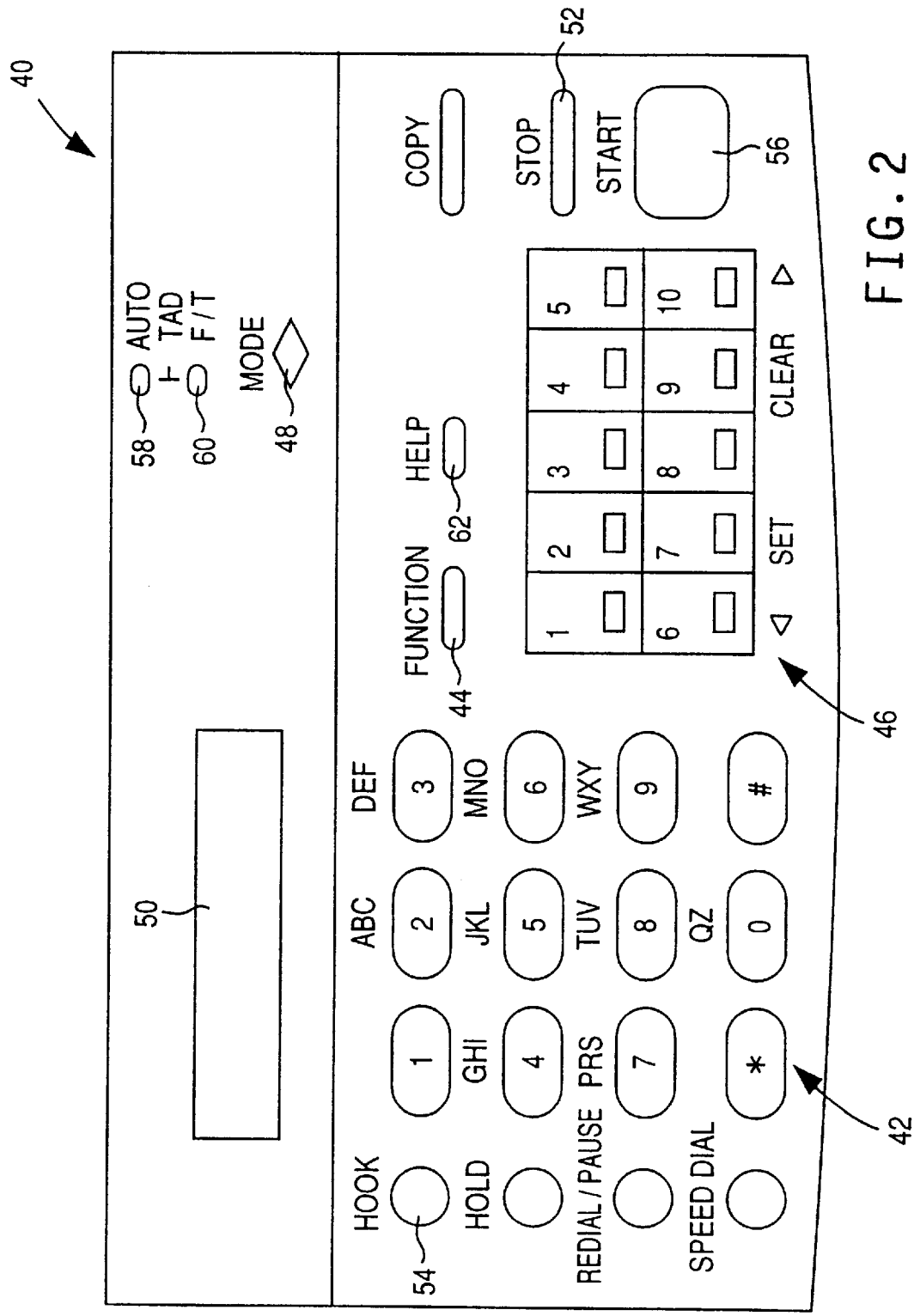
FIG. 2 is a view illustrating an operator's control and display panel provided in the facsimile system of FIG. 1.

The panel control CPU 36 is adapted to control an operator's control and display panel 40 according to signals from the CPU 24, and transmit output signals of the panel 40 to the CPU 24. An example of the panel 40 is illustrated in FIG. 2. In this example, the panel 40 includes: numeral and function keys 42 generally known as "TEN keys"; a FUNCTION key 44; SELECTOR keys 46; a MODE key 48; and a display 50 such as a liquid crystal display. The numeral and function keys 42 are used to enter data such as telephone numbers, and include ten numeral keys representative of numerals "0" through "9". The FUNCTION key 44 is used together with the SELECTOR keys 46, to achieve or change various functional settings as indicated in FIG. 3. As described below in detail with respect to the setting or selection of D/R modes, a functional setting is accomplished by first pressing the FUNCTION key 44 and then pressing appropriate ones of the SELECTOR keys 46 in a predetermined order.

In the present embodiment, a plurality of telephone numbers are used for the facsimile system 10 so that a distinctive ringing service (D/R service) by a telephone exchange company as described above in the BACKGROUND OF THE INVENTION is available in the facsimile system 10. Described more specifically, a call signal CI having a specific pattern (ON/OFF pattern as indicated in FIG. 17) is received to call each of the telephone numbers, and one of the call signals is assigned to call the telephone number which is exclusively used for the facsimile signal reception by the facsimile system 10. That is, the pattern of the facsimile reception call signal is registered as the facsimile reception pattern which calls the telephone number exclusively used for the facsimile signal reception. When a call signal CI is received by the facsimile system 10, the CPU 24 determines whether the pattern of the received call signal CI is the same as the registered facsimile reception pattern, so that a facsimile signal transmitted from a remote facsimile transmitter with the call signal CI is automatically received and processed for recording the corresponding image by the image recorder 14 if the pattern of the received call signal CI is the same as the registered facsimile reception pattern, as described below in detail.

For the facsimile system 10 to receive the D/R service, the facsimile reception pattern of the call signal CI must be registered while the system 10 is placed in a D/R SET mode as described below by reference to the flow chart of FIGS. 4 and 5. With the pattern of the facsimile reception call signal registered, the above-indicated automatic facsimile reception function is available when the system 10 is placed in a D/R ON mode (when an affirmative decision is obtained in step R2 of the flow chart of FIG. 7 as described below). When the system 10 is placed in a D/R OFF mode, the determination regarding the pattern of the received call signal CI is not effected.

Thus, there are three D/R modes: D/R ON mode; D/R OFF mode and D/R SET mode. To register the pattern of the facsimile reception call signal CI for utilizing the D/R service, the D/R SET mode must be selected. To select one of the D/R modes, a function setting mode must be selected by pressing the FUNCTION key 44. Then, the keys "6" and "7" of the SELECTOR keys 46 are pressed in this order, to select "6. TEL OPTION" of the MAIN ITEMS and "7. DISTINCTIVE" of the SUB-ITEMS in a function table illustrated in FIG. 3. With the keys "6" and "7" pressed, the display 50 provides an indication "7. DISTINCTIVE". In this condition, the key "7" labelled "SET" of the SELECTOR keys 46 is pressed, and the currently selected or established D/R mode is displayed on the display 50. That is, the displays 50 provides indications "DISTINCTIVE: OFF", "DISTINCTIVE: ON" and "DISTINCTIVE: SET" when the D/R ON, D/R OFF and D/R SET modes are currently selected, respectively. The selected D/R mode is changed each time the key "6" or "10" of the SELECTOR keys 46 is pressed. The keys "6" and "10" are used as shift keys. When the key "7" labelled "SET" of the SELECTOR keys 46 is pressed when the desired D/R mode is indicated on the display 50, that D/R mode is selected or established as the effective D/R mode. However, the D/R ON mode cannot be displayed or selected unless the facsimile reception pattern of the call signal CI has been registered in the manner described below.

By pressing a STOP key 52 after pressing of the SET key "7" of the SELECTOR keys 46, the control goes out of the function setting mode and returns to a normal operation mode for telephone and facsimile reception and transmission. In the normal operation mode, the display 50 provides a predetermined indication such as the current time when the D/R ON or D/R OFF mode is selected. However, the display 50 provides an indication "D/R SET MODE" when the D/R SET mode is currently selected. The RAM 28 stores data indicative of the currently selected D/R mode of the system 10.

The MODE key 48 is used to select one of reception modes of the facsimile system 10, namely, automatic facsimile reception mode (hereinafter referred to as "AUTO mode"), selective facsimile/telephone reception mode (hereinafter referred to as "F/T mode"), telephone answering mode (hereinafter referred to as "TAD mode") and manual reception mode (hereinafter referred to as "MANUAL mode"). These reception modes will be described later by reference to the flow charts of FIGS. 7–9. The currently selected reception mode is changed each time the MODE key 48 is pressed. When the AUTO mode is selected, a light emitting diode 58 is on. When the F/T mode is selected, a light emitting diode 60 is on. When the TAD mode is selected, the diodes 58, 60 are both on. When the MANUAL mode is selected, the diodes 58, 60 are both off. The RAM 28 also stores data indicative of the currently selected reception mode of the system 10.

Referring next to the flow charts of FIGS. 4–6, there will be described a routine which is executed by the CPU 24 to register the pattern of the facsimile reception call signal CI corresponding to the telephone number exclusively used for facsimile signal reception. This routine can be executed only after the D/R SET mode is selected by using the FUNCTION key 44 and the SELECTOR keys 46 as described above. With the facsimile system 10 thus placed in the D/R SET mode, the call signal CI having a specific facsimile reception pattern to be registered is received from a telephone exchange company in response to a call from a remote telephone or facsimile transmitter, for the purpose of registering the facsimile reception pattern. As a result, an affirmative decision (YES) is obtained in the first step S1 of the pattern registering routine of FIGS. 4 and 5, and the control flow goes to step S2. Step S1 is repeatedly implemented until the call signal CI is received by the facsimile system 10. The call signals CI corresponding to the respective telephone numbers used by the facsimile system 10 have different patterns (ON-OFF patterns) as indicated at (a) through (d) in FIG. 17 by way of example. All of the call signals CI have a predetermined frequency in the ON state, and therefore each call signal CI received can be recognized as the call signal calling the appropriate telephone number.

When the call signal CI having the facsimile reception pattern corresponding to the telephone number used exclusively for the facsimile signal reception by the facsimile system 10 is received, step S2 is implemented to activate the display 50 to provide an indication "CALL SIGNAL RECEIVED", and activate the speaker 26 to generate a ringing sound corresponding to the pattern of the received call signal CI. Then, the control flow goes to step S3 to execute a sub-routine for detecting or analyzing the pattern of the received call signal CI.

Figure 5:
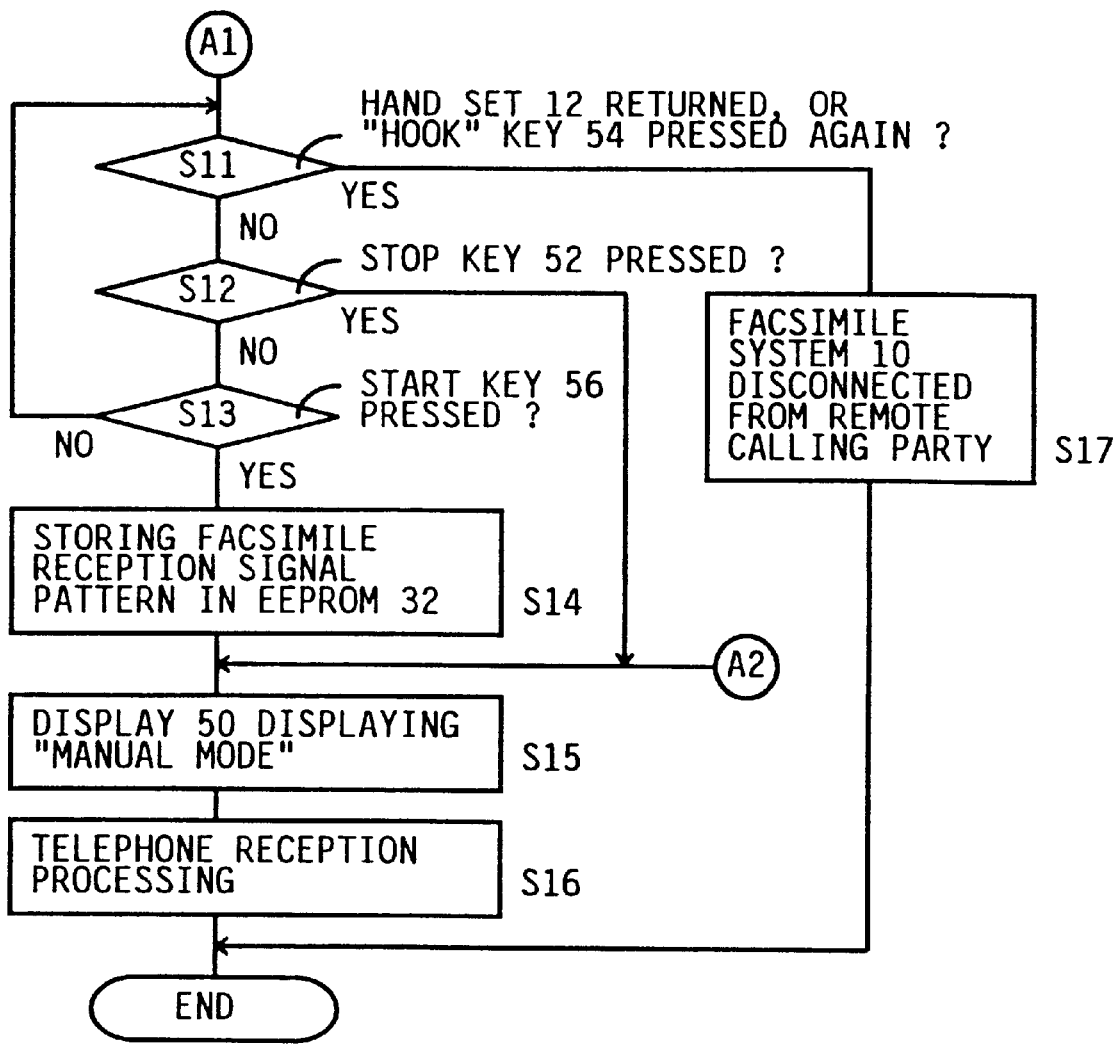
Figure 6:
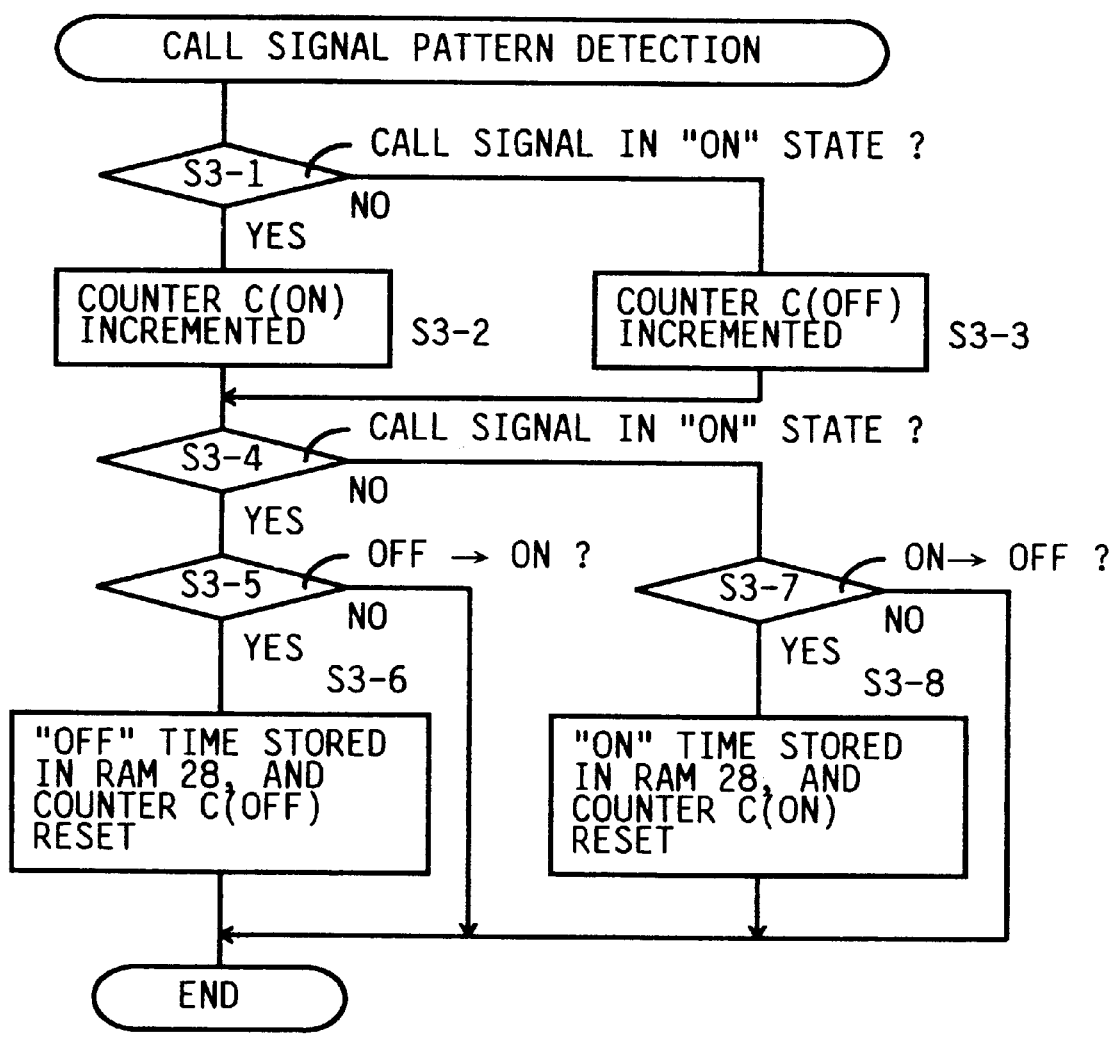
FIG. 6 is a flow chart illustrating a sub-routine executed in step S3 of the routine of FIGS. 4 and 5.

The sub-routine of step S3 is illustrated in the flow chart of FIG. 6. This sub-routine is initiated with step S3-1 to determine whether the call signal CI is in the ON state or not. This determination is made based on the frequency of the received call signal. If the call signal CI is in the ON state, step S3-2 is implemented to increment a counter C(ON). If the call signal CI is in the OFF state, step S3-3 is implemented to increment a counter C(OFF). These counters C(ON) and C(OFF) are both reset to zero before the routine of FIGS. 4–5 is executed, and also in steps S3-8 and S3-6, respectively. In the main routine of FIGS. 4–5, steps S3, S4 and S9 are repeatedly implemented at a predetermined cycle time until an affirmative decision (YES) is obtained in step S4 or S9. That is, the sub-routine of FIG. 6 is repeatedly executed at the predetermined cycle time, and the counter C(ON) or C(OFF) is selectively incremented each time the sub-routine S3-1 is repeatedly executed. Thus, the ON-time and OFF-time of the received call signal CI are measured in the form of the counts of the counters C(ON) and C(OFF). In other words, the contents of the counters C(ON) and C(OFF) represent the ON- and OFF-times of the call signal CI, namely, the pattern of the call signal CI.

Step S3-2 and S3-3 are followed by step S3-4 to determine again whether the call signal CI is in the ON state or not. The decision obtained in step S3-1 may be utilized in this step S3-4. If an affirmative decision (YES) is obtained, the control flow goes to step S3-5 to determine whether the state of the call signal CI has been just turned from OFF to ON, that is, is changed to ON in the present cycle of execution of the sub-routine of FIG. 6 (routine of FIGS. 4 and 5). This determination is made on the basis of the content of a flag indicating the state of the call signal CI in the last cycle. If an affirmative decision (YES) is obtained in step S3-5, step S3-6 is implemented to store in the RAM 28 data representative of the content or count of the counter C(OFF), that is, the OFF time of the call signal CI, and then reset the counter C(OFF) to zero. If a negative decision (NO) is obtained in step S3-5, that is, if the call signal CI remains ON, the sub-routine of FIG. 6 is terminated, and the control flow goes to step S4 of the main routine. If a negative decision (NO) is obtained in step S3-4, that is, if the state of the call signal CI is currently OFF, the control flow goes to step S3-7 to determine whether the state of the call signal CI has been just turned from ON to OFF, that is, is changed to OFF in the present cycle. This determination is also made on the basis of the flag indicating the state of the call signal in the last cycle. If an affirmative decision (YES) is obtained in step S3-7, step S3-8 is implemented to store in the RAM 28 data representative of the content or count of the counter C(ON), that is, the ON time of the call signal CI, and then reset the counter C(ON) to zero. If a negative decision (NO) is obtained in step S3-8, namely, if the call signal CI remains OFF, the sub-routine of FIG. 6 is terminated, and the control flow goes to step S4 of the main routine.

Step S3 described above by reference to FIG. 6 is followed by step S4 to determine whether the two periods of the call signal CI have been analyzed. If an affirmative decision (YES) is obtained in step S4, the control flow goes to step S5. If a negative decision (NO) is obtained in step S4, the control flow goes to step S9. The determination in step S4 is made by checking if the RAM 28 has stored the pattern data representative of two occurrences of an ON-OFF pattern consisting of the alternate ON and OFF times (states) as indicated at (a)–(d) in FIG. 17. However, the determination may be made by checking if two long OFF states of the call signal CI have been detected. In this respect, it is noted that all the call signal C have one comparatively long OFF state time. If a negative decision (NO) is obtained in step S4, the control flow goes to step S9 to determine whether the telephone hand set 12 has been picked up or a HOOK key 54 on the panel 40 has been pressed. The hand set 12 may be picked up by the user or the HOOK key 54 may be pressed by the user if the user does not recognize that the facsimile system 10 is now placed in the D/R SET mode. If a negative decision (NO) is obtained in step S9, the control flow goes back to step S3. If the hand set 12 has been picked up or the HOOK key 54 is turned ON by mistake by the user, step S10 is implemented to turn off the speaker 26, and connect the facsimile system 10 as the called party to a remote facsimile system as the calling party. Step S10 is followed by step S15 (FIG. 5).

In step S5 which is implemented if the affirmative decision (YES) is obtained in step S4, the display 50 provides a message "PICK UP HAND SET 12 TO REGISTER FACSIMILE RECEPTION SIGNAL PATTERN". Step S5 is followed by step S6 to determine whether the hand set 12 has been picked up or the HOOK key 54 has been pressed. If an affirmative decision (YES) is obtained in step S6, the control flow goes to step S7 to turn off the speaker 26 and connect the facsimile system 10 to the remote facsimile system. Then, step S8 is implemented to activate the display 50 to provide a message "REGISTER FACSIMILE RECEPTION CALL SIGNAL PATTERN". Step S8 is followed by step S11 (FIG. 5) to determine whether the hand set 12 has been returned in place or the HOOK key 54 has been pressed again by mistake by the user. If an affirmative decision (YES) is obtained in step S11, the control flow goes to step S17 to disconnect the facsimile system 10 from the remote facsimile system, and one cycle of execution of the routine is terminated. If a negative decision (NO) is obtained in step S11, the control flow goes to step S12 to determine whether the STOP key 52 has been pressed. If the key 52 is on, step S12 is followed by step S15. The STOP key 52 is used to cancel the registration of the pattern of the call signal CI as detected or analyzed in step S3, for some reason or other. For instance, the user presses the STOP key 52 if the user finds that the ringing sound generated by the speaker 26 in step S2 is different from that of the call signal assigned to call the telephone number exclusively used for the facsimile signal reception, namely, the call signal CI received calls the telephone number which is not exclusively used for the facsimile signal reception. If a negative decision (NO) is obtained in step S12, the control flow goes to step S13 to determine whether a START key 56 has been pressed. Steps S11–S13 are repeatedly implemented until an affirmative decision (YES) is obtained in any one of these steps. If an affirmative decision is obtained in step S13, step S14 is implemented to store in the EEPROM 32 the pattern of the call signal CI as detected in step S3, more precisely, the ON and OFF times corresponding to one period of the call signal CI, which are stored in the RAM 28. This pattern is stored as the pattern of the facsimile reception call signal CI assigned to call the telephone number exclusively used for the facsimile signal reception. With step S14 completed, the D/R mode of the facsimile system 10 is automatically changed from the D/R SET mode to the D/R ON mode.

Step S14 is followed by step S15 to activate the display 50 to provide an indication "MANUAL MODE", and step S16 to permit telephone communication with the remote party calling the appropriate telephone number, without activating the speaker 26. In this respect, it is noted that the hand set 12 has already been picked up or the HOOK key 54 has already been pressed in step S6. In this MANUAL reception mode, the facsimile system 10 may receive and process a facsimile signal from the remote facsimile transmitter, if the START key 56 is pressed, as described later with respect to step R11 of FIG. 7.

Figure 7:
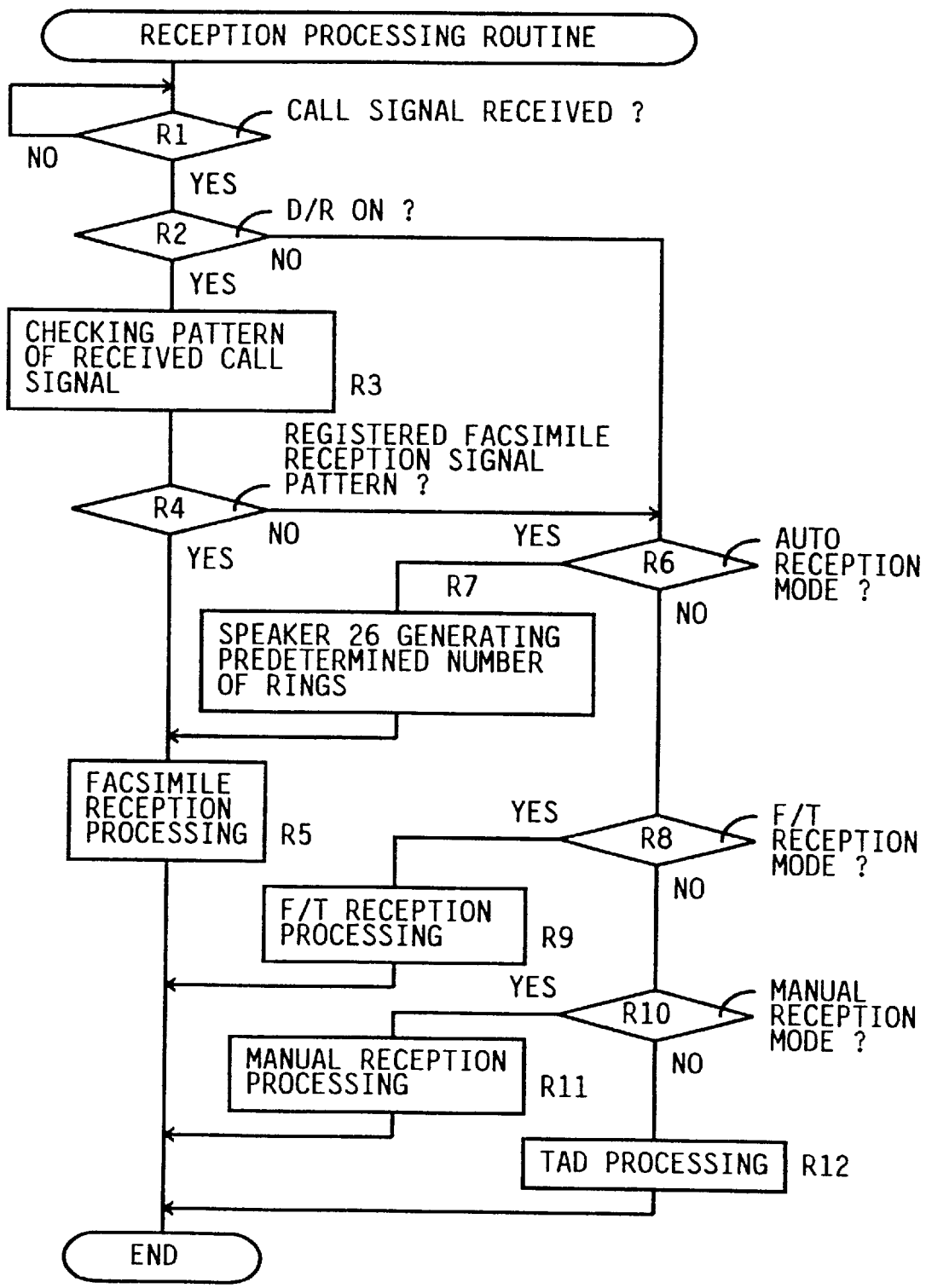
FIG. 7 is a flow chart illustrating a routine executed upon reception of a call signal.

When the facsimile system 10 is placed in the D/R ON mode or D/R OFF mode (and in one of the four reception modes (AUTO, F/T, TAD and MANUAL), a reception processing routine of FIG. 7 is executed to process the received call signal CI and a facsimile or telephone signal. The routine of FIG. 7 is initiated with step R1 to determine whether the call signal CI has been received, as in step S1 of the routine of FIGS. 4–5. If an affirmative decision (YES) is obtained in step R1, the control flow goes to step R2 to determine whether the facsimile system 10 is placed in the D/R ON more. This determination is made on the basis of the data stored in the RAM 28, which represent the currently selected D/R mode. If the D/R ON mode is currently selected, step R3 is implemented. If the D/R ON mode is not selected, that is, if the D/R OFF mode is selected, the control flow goes to step R6.

Figure 8:
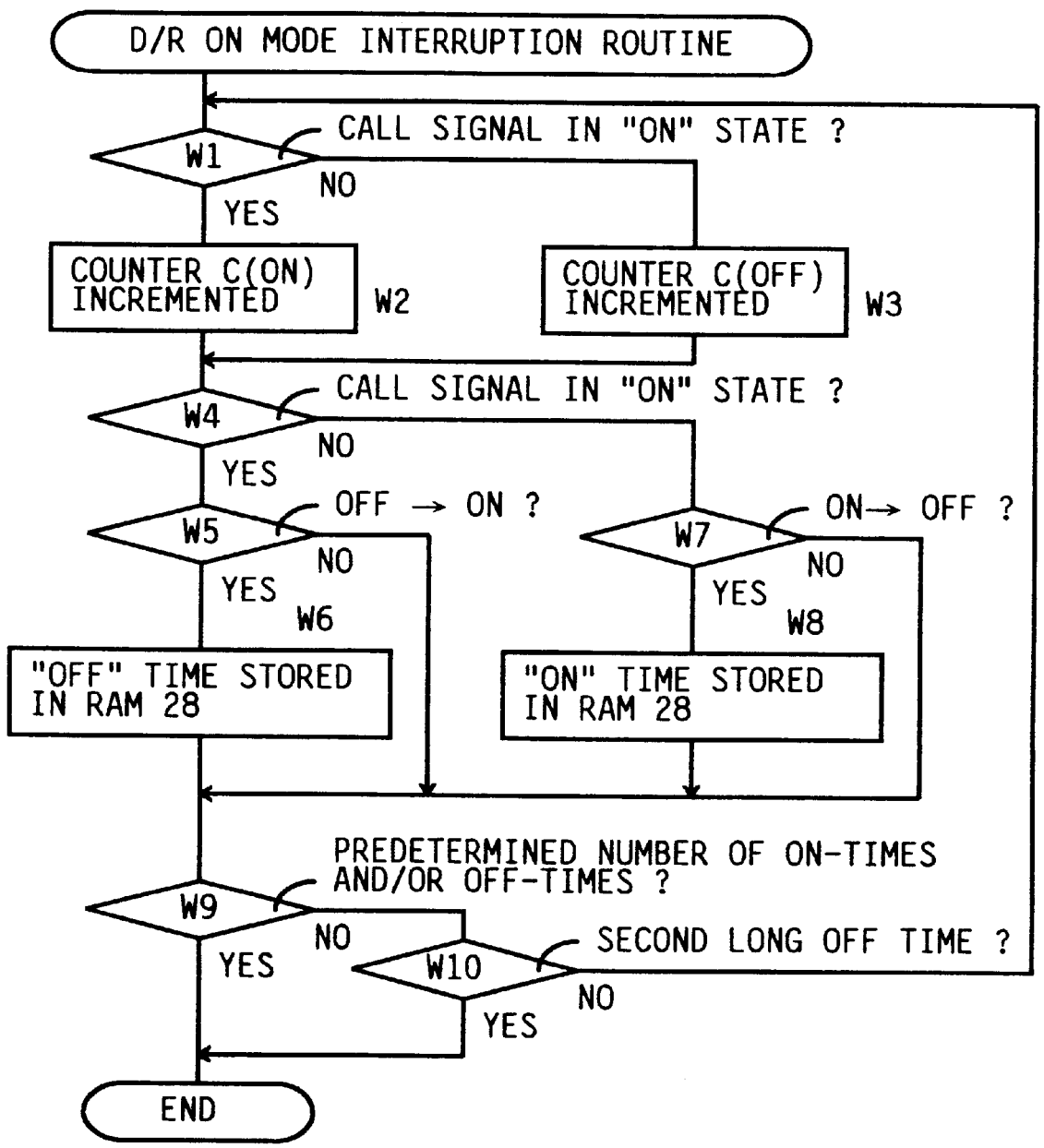
FIG. 8 is a flow chart illustrating an interruption routine executed when the facsimile system is placed in a D/R ON mode.

If the D/R ON mode is currently selected, a D/R ON mode interruption routine of FIG. 8 is executed. This interruption routine includes steps W1 through W8 which are identical with steps S3-1 through S3-8 of the sub-routine of FIG. 6, so that the ON and OFF times of the received call signal CI as represented by the contents of the counters C(ON) and C(OFF) are stored in the RAM 28, in steps W6 and W8. Steps W6 and W8 are followed by step W9 to determine whether the number of the stored ON times or OFF times or the total number of the stored ON and OFF times is equal to a predetermined number, namely, equal to the number of the ON times and/or OFF times of the pattern of the facsimile reception call signal as represented by the data stored in the EEPROM 32 in step S14 (FIG. 5). If an affirmative decision (YES) is obtained in step W9, the present interruption routine is terminated, and the control goes to step R3 of the reception routine.

The call signal indicated at (a) in FIG. 17 has one ON-time and one OFF-time (long OFF-time). The call signal indicated at (b) in FIG. 17 has two ON-times and two OFF-times (including one long OFF-time), while the call signals indicated at (c) and (d) in FIG. 17 have three ON-times and three OFF-times (including one long OFF-time). If the signal pattern indicated at (a) is registered (by the routine of FIGS. 5–6) as the facsimile reception pattern, an affirmative decision (YES) is obtained in step W9 when only one ON-time, only one OFF-time or only one ON-time and only one OFF-time has/have been detected. If the affirmative decision (YES) is obtained in step W9, the control flow goes to step R3. If a negative decision (NO) is obtained in step W9, step W10 is implemented to determine whether the second long OFF-time has been detected. The affirmative decision (YES) should be obtained in step W9 before the two long OFF-times have been detected. In other words, the affirmative decision (YES) is usually obtained in step W9 before an affirmative decision (YES) is obtained in step W10. If the affirmative decision is obtained in step W10 before the affirmative decision is obtained in step W9, this means that the pattern of the call signal received is not the registered facsimile reception pattern. In this case, a negative decision (NO) is obtained in step R4, without implementing step R3.

The interruption routine of FIG. 8 is followed by step R3 of the reception processing routine of FIG. 7 wherein the ON- and OFF-times stored in the RAM 28 in steps W6 and W8 are compared with the ON- and OFF-times stored in the EEPROM 32, that is, the ON- and OFF-times of the registered facsimile reception pattern. If two or more ON-times or OFF-times are stored in the EEPROM 32, the comparison is made for each of those ON- or OFF-times. If the ON- and OFF-times in the RAM 28 have the same pattern as that of the ON- and OFF-times stored in the EEPROM 32, an affirmative decision (YES) is obtained in step R4. However, the determination in step R4 may be made without checking all of the ON-times or OFF-times or ON- and OFF-times have been checked for coincidence with those of the registered pattern, since the different call signals have different combinations of ON- and OFF-times. If the affirmative decision (YES) is obtained in step R4, the control flow goes to step R5 for automatic reception and processing of a facsimile signal if received from the remote facsimile transmitter, irrespective of the currently selected reception mode, so that an image is recorded on the recording medium by the image recorder 14 according to the processed facsimile signal.

The present embodiment is characterized by the provision of step R4, and steps which are implemented if a negative decision (NO) is obtained in step R4. If the negative decision (NO) is obtained in step R4, the control flow goes to step R6 to determine whether the facsimile system 10 is now placed in the AUTO reception mode. This determination is made on the basis of the data stored in the RAM 28, which represent the currently selected reception mode. If an affirmative decision (YES) is obtained in step R6, step R7 is implemented to activate the speaker 26 to generate a predetermined number of ringing sounds, and then step R5 is implemented to automatically receive and process the facsimile signal as described above. If the hand set 12 is picked up or the HOOK key 54 is pressed by the user after the ringing sounds are generated in step R7, step similar to step S16 of the routine of FIGS. 4–5 is implemented for permitting telephone communication with a remote telephone transmitter/receiver. This aspect is not shown in the flow chart of FIG. 7. If a negative decision (NO) is obtained in step R6, the control flow goes to step R8 to determine whether the facsimile system 10 is placed in the F/T reception mode. If an affirmative decision (YES) is obtained in step R8, the control flow goes to step R9 in which the facsimile system 10 as the called party is first connected to the remote facsimile system as the calling party, and the speaker 26 is activated to generate a ringing sound for a predetermined time. If the hand set 12 is picked up or the HOOK key 54 is pressed in response to the ringing sound, telephone communication with the calling party is made possible. If the hand set 12 is not picked up or the HOOK key 54 is not pressed for more than a predetermined time, a facsimile signal following the call signal is processed for the image recorder 14 to record an image represented by the facsimile signal.

Referring back to the reception processing routine of FIG. 7, the control flow goes to step R10 if a negative decision (NO) is obtained in step R8. Step R10 is provided to determine whether the facsimile system 10 is now placed in the MANUAL reception mode. If the MANUAL reception mode is selected, step R11 is implemented to effect manual reception processing, which includes activation of the speaker 26 to generate a ringing sound corresponding to the pattern of the call signal CI (which is not the registered facsimile reception pattern). According to this manual reception processing, the speaker 26 is turned off and telephone communication with a remote telephone transmitter/receiver is permitted if the hand set 12 is taken up or the HOOK key 54 is pressed. If the START key 56 is pressed, a facsimile signal if received is processed for recording. If a negative decision (NO) is obtained in step R10, this means that the facsimile system 10 is placed in the TAD reception mode, which is usually selected when the system 10 is left unattended by the user. That is, the system 10 incorporates an automatic telephone answering device, and the audio DRAM 34, which are used when the system 10 is placed in the TAD reception mode. When this TAD mode is established, step R12 is implemented to effect TAD processing. According to this TAD processing, the facsimile system 10 is connected to the remote facsimile system, and a facsimile signal received following the call signal is automatically processed for the image recorder 14 to record an image represented by the facsimile signal if the facsimile system 10 receives a facsimile signal transmission signal CNG (calling tone signal) indicating that the facsimile signal will be transmitted from the remote facsimile system, or a facsimile signal processing signal ID which requests the facsimile system 10 to process the facsimile signal. If none of these signals CNG and ID are received, the speaker 26 is activated to generate a ringing sound for a predetermined time. If the hand set 12 is picked up or the HOOK key 54 is pressed in response to the ringing sound, telephone communication with the calling party is made possible. If the hand set 12 is not picked up or the HOOK key 54 is not pressed, the speaker 26 is turned off, and an outgoing message stored in the audio DRAM 34 is transmitted to the remote telephone receiver, while an incoming message received from the remote telephone transmitter is stored in the audio DRAM 34.

The present facsimile system 10 may be easily placed in the D/R SET mode by using the FUNCTION key 44 and the SELECTOR keys 46, so that the pattern of the call signal CI calling the telephone number assigned to receive the facsimile signal from a remote facsimile system is registered as the facsimile reception pattern in a pattern data memory in the form of the EEPROM 32. In this case, the call signal CI having that facsimile reception pattern to be registered is received from the telephone exchange company. This procedure for registering the pattern of the facsimile reception call signal does not require the user to recognize the pattern of the received call signal while listening to the ringing sound generated in response to the received call signal.

In the present invention, the EEPROM 32 functions as pattern data memory for storing pattern data representative of the pattern of the facsimile reception call signal CI, and the FUNCTION key 44 and SELECTOR keys 46 constitute operator-controlled means for establishing a registering mode in the form of the D/R SET mode in which the pattern of the facsimile reception call signal can be stored in the pattern data memory. Further, portions of the CPU 24, RAM 28 and ROM 30 assigned to implement step S3 of FIG. 3 (i.e., sub-routine of FIG. 6) constitute pattern detecting means for detecting the pattern of the facsimile reception call signal when this call signal is received while the facsimile system 10 is placed in the registering mode or D/R SET mode. It is also noted that portions of the CPU 24, RAM 28 and ROM 30 assigned to implement step S14 of FIG. 5 constitute pattern registering means, which is operable in the registering mode, for registering the pattern of the facsimile reception call signal as detected by the pattern detecting means in step S3, in the pattern data memory 32 as the pattern data in relation to the facsimile reception telephone number. Further, portions of the CPU 24, RAM 28 and ROM 30 assigned to implement steps R3 and R4 of FIG. 7 and the interruption routine of FIG. 8 constitute pattern determining means, operable when the facsimile system 10 is not placed in the D/R SET mode, for comparing the pattern of a received call signal, with each pattern represented by the pattern data stored in the pattern data memory 32, and thereby determining the telephone number being called by the received call signal.

Referring next to FIGS. 9–13, there will be described a second embodiment of the present invention.

Figure 9A:
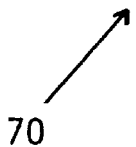
FIGS. 9(a) and ((b) are views indicating memory areas of EEPROM and audio DRAM used in a second embodiment of this invention.
Figure 9B:
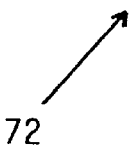

The facsimile system according to this second embodiment uses EEPROM 70 AND audio DRAM 72 in place of the EEPROM 32 and audio DRAM 34 used in the first embodiment. As indicated in FIG. 9(a), the EEPROM 70 has four memory areas corresponding to registration numbers [0] through [3]. The first memory area corresponding to the registration number [0] is used for storing the facsimile reception call signal pattern corresponding to the facsimile reception telephone number, while the second, third and fourth memory areas corresponding to the registration numbers [1], [2] and [3] are used for storing the patterns of the other call signals used for telephone communication. On the other hand, the audio DRAM 72 has four memory areas, namely, areas for storing an outgoing message (OGM) and an incoming message (ICM) as described above with respect to step R12, an area for storing a memorandum message, and a call message area for storing call messages, as indicated in FIG. 9(b). The call message area has three sub-areas corresponding to registration numbers [1], [2] and [3], for storing respective call messages corresponding to the respective telephone numbers.

As indicated above, the distinctive ringing service available from a telephone exchange company permits two or more users to use different telephone numbers on a single facsimile system or telephone set or two or more facsimile systems or telephone sets connected to a single telephone line. Since the different ringing sounds are generated according to the different patterns of the respective call signals which call the respective telephone numbers, the users can know who receive telephone calls or facsimile messages. However, the users usually feel difficulty in distinguishing the telephone numbers being called, by means of the ringing sounds. To assist the users in this respect, the call messages are provided by the speaker 26, informing the users of the recipient of a telephone call or facsimile transmission.

Suppose three telephone numbers [111], [2222] and [3333] are used for one facsimile system used by Messrs. A and B, the telephone number [1111] is used exclusively for facsimile reception, while the telephone numbers [2222] and [3333] are used for telephone communication exclusively by Mr. A and Mr. B, respectively, for example. In this case, the pattern of the call signal calling the facsimile reception telephone number [1111] is registered as the facsimile reception pattern in the memory area corresponding to the registration number [0] of the EEPROM 70, as indicated in FIG. 10. In the memory area corresponding to the registration number [1] of the EEPROM 70, the pattern of the call signal calling the telephone number [2222] used by Mr. A is registered. In the sub-area corresponding to the registration number [1] of the call message area of the audio DRAM 72, there is stored a suitable call message, for example, "Mr. A, you have a phone call.". Similarly, the pattern of the call signal calling the telephone number [3333] used by Mr. B is registered in the memory area corresponding to the registration number [2], while a suitable call message such as "Mr. B, you have a phone call." is stored in the sub-area corresponding to the registration number [2] of the call message area of the audio DRAM 72, as also indicated in FIG. 10. Any call messages desired by the users can be stored in the call message area of the audio DRAM 72.

Figure 4:
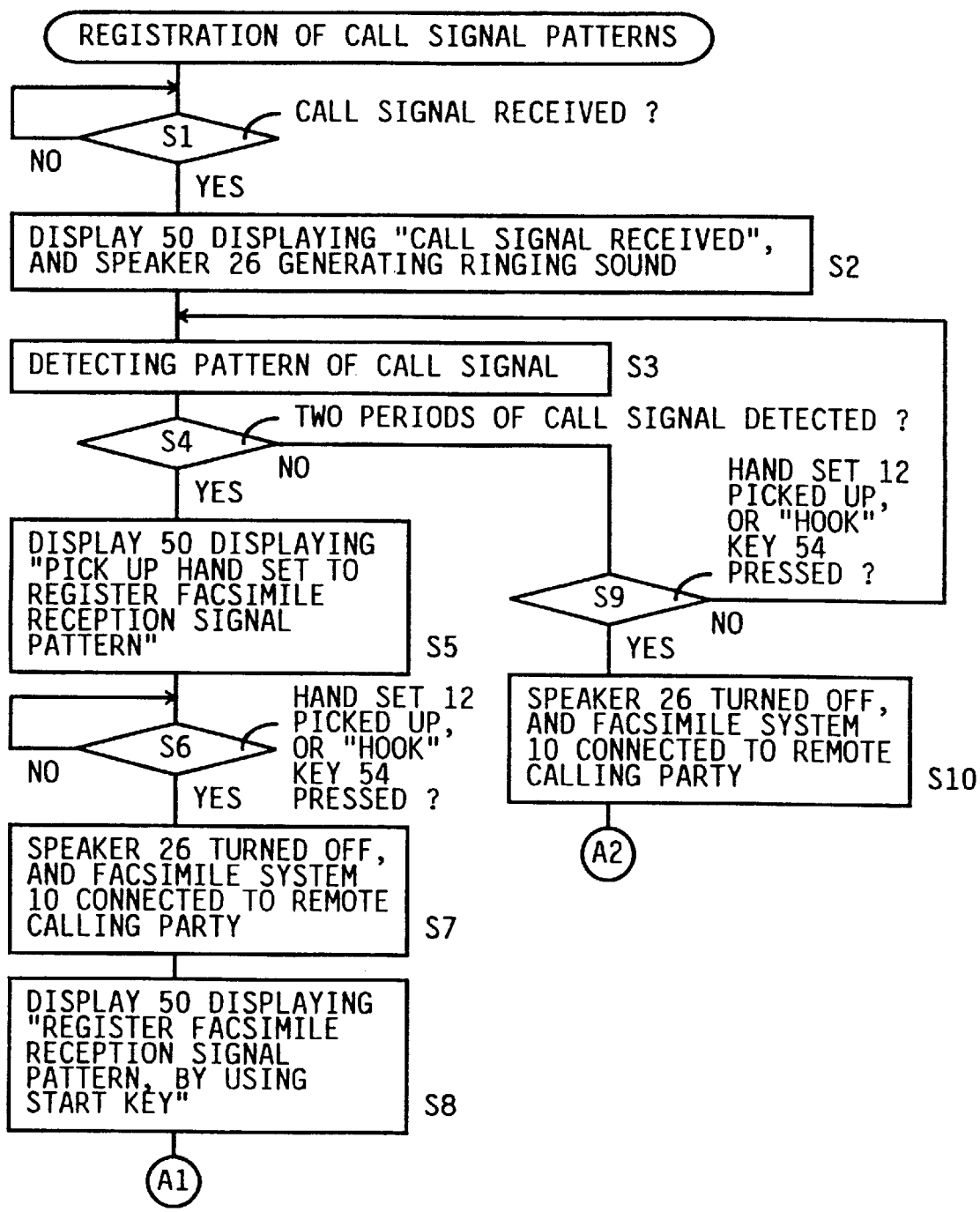
FIGS. 4 and 5 are flow charts illustrating a routine for registering the pattern of a facsimile reception call signal for facsimile reception in the facsimile system of FIG. 1.
Figure 11:
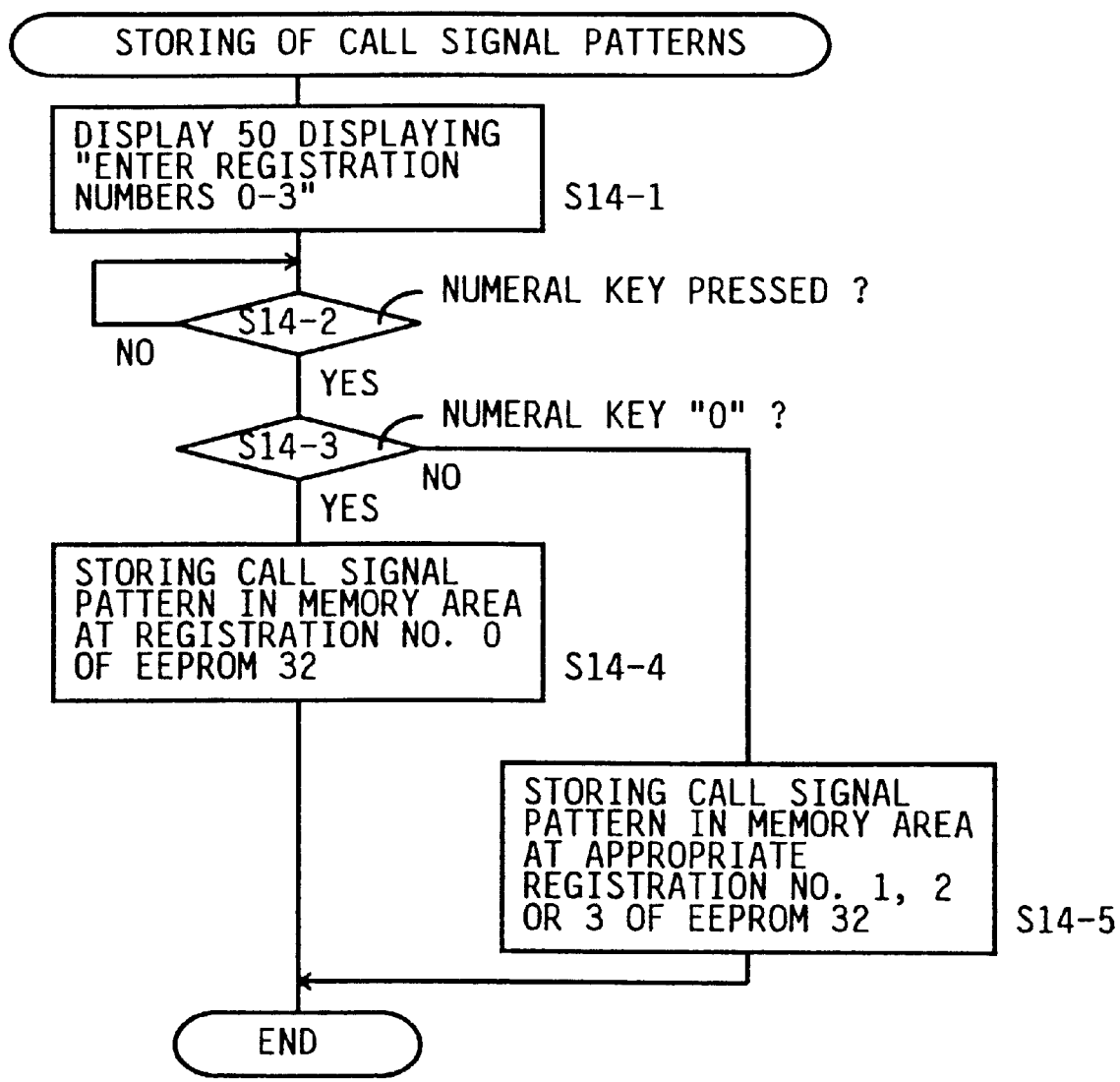
FIG. 11 is a flow chart illustrating a sub-routine executed in step S14 of the routine of FIGS. 4 and 5 to store the call signal patterns in the EEPROM of FIG. 9(a) and 9(b)

The patterns of the call signals corresponding to the respective telephone numbers may be registered or stored in the EEPROM 70, in the routine of FIGS. 4 and 5 executed while the facsimile system is placed in the D/R SET mode, in substantially the same manner as described above with respect to the first embodiment. In the present second embodiment, however, the patterns of the four call signals are registered in the respective areas of the EEPROM 70. To this end, step s14 of FIG. 5 is formulated as a sub-routine as illustrated in the flow chart of FIG. 11. The sub-routine of FIG. 11 is initiated with step S14-1 to activate the display 50 to provide a display "ENTER REGISTRATION NUMBER [0], [1], [2] OR [3]". Step S14-1 is followed by step S14-2 to determine whether any data are keyed in, more specifically, any of the numeral keys 42 corresponding to the numerals "0" through "3" has been pressed. When the pattern of the call signal calling the facsimile reception telephone number [1111] is registered, the numeral key 42 corresponding the numeral "0" is pressed. Similarly, the numeral keys 42 corresponding to the numerals "1" and "2" are pressed to register the patterns of the call signals calling the telephone numbers [2222] and [3333] used by Messrs. A and B, respectively. If any numeral key 42 corresponding to the numeral "0", "1" or "2" is pressed, the control flow goes to step S14-3 to determine whether the numeral key 42 corresponding to the numeral "0" has been pressed. If an affirmative decision (YES) is obtained in step S14-3, the control flow goes to step S14-4 in which the pattern of the facsimile reception call signal detected in step S3 (sub-routine of FIG. 6) is stored in the memory area corresponding to the registration number [0] of the EEPROM 70. If a negative decision (NO) is obtained in step S14-3, the control flow goes to step S14-5 in which the pattern of the call signal stored in the RAM 28 in step S3 is stored in the memory area of the EEPROM 70 which corresponds to the registration number designated in step S14-2.

To record or store the call messages in the audio DRAM 72, the facsimile system 10 is placed in a MESSAGE RECORDING mode. This mode can be established by first pressing the FUNCTION key 44, and then the keys "6" and "8" of the SELECTOR keys 46 in this order to select "6. TEL OPTION" of the MAIN ITEMS and "8. RING MESSAGE" of the SUB-ITEMS in the function table illustrated in FIG. 3. With the keys "6" and "8" pressed, the display 50 provides an indication "8. RING MESSAGE". In this condition, the key "7" labelled "SET" of the SELECTOR keys 46 is pressed, and the facsimile system 10 is placed in the MESSAGE RECORDING mode in which call messages can be stored in the audio DRAM 72 in a routine illustrated in the flow chart of FIG. 12.

Figure 12:
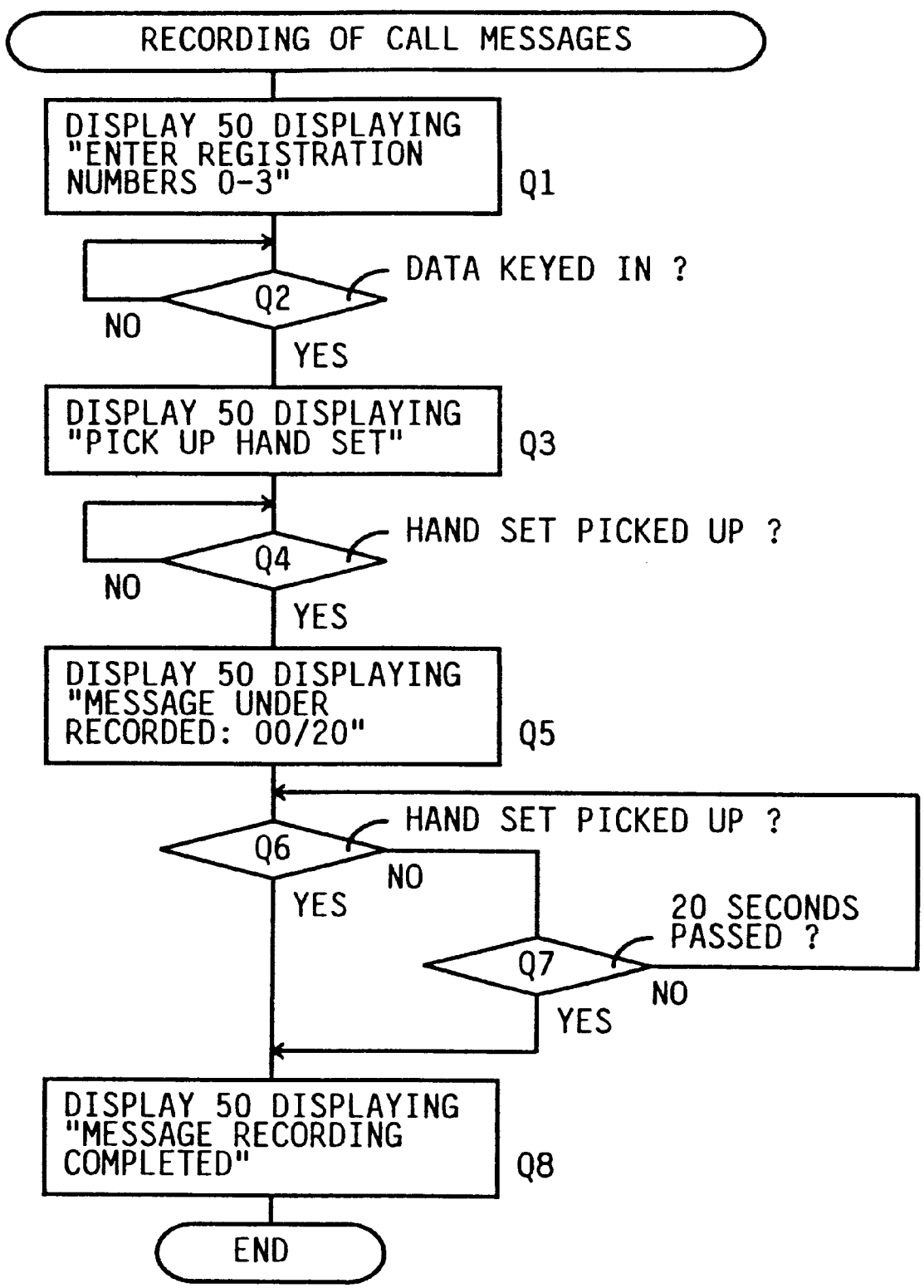
FIG. 12 is a flow chart illustrating a routine for storing call messages in the audio DRAM of FIG. 9(b)
Figure 13:
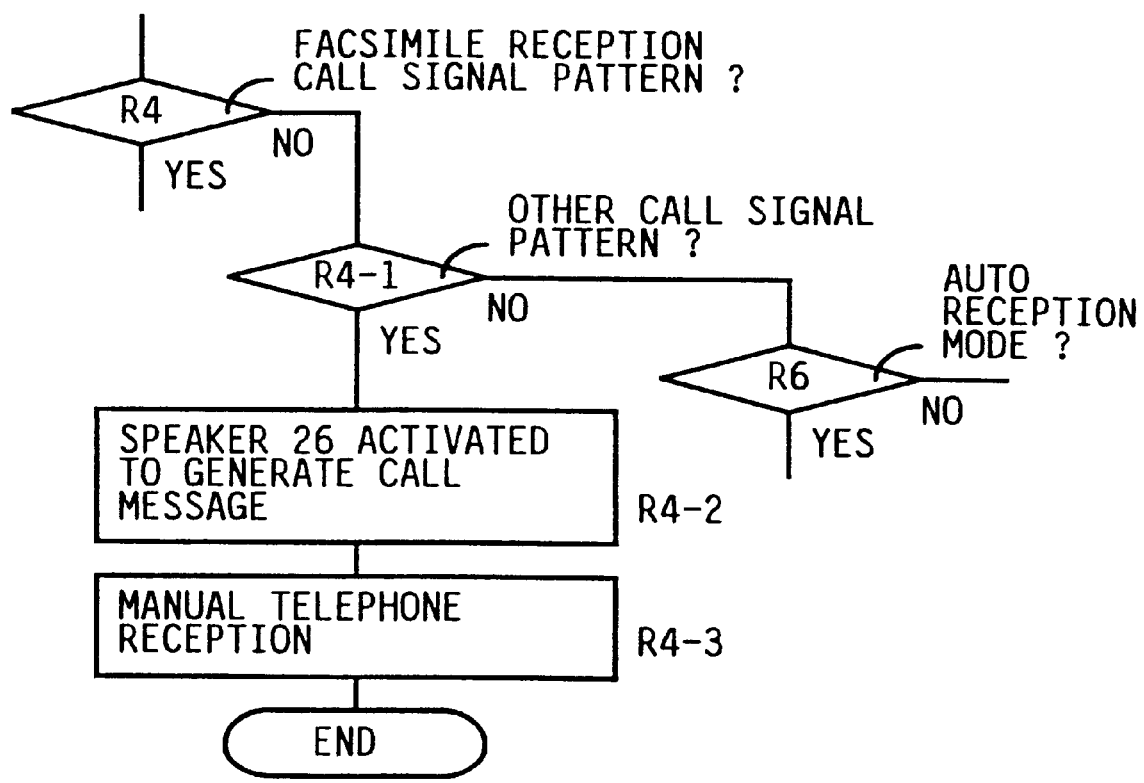
FIG. 13 is a flow chart illustrating an operation performed when the facsimile system according to the second embodiment is placed in D/R ON mode and when a negative decision (NO) is obtained in step R4 of the routine of FIG. 7.

The routine of FIG. 12 is initiated with step Q1 in which the display 50 is activated to provide a display "ENTER REGISTRATION NUMBER [1], [2] OR [3]". Step Q1 is followed by step Q2 to determine whether any of the numeral keys 42 corresponding to the numerals "0" through "3" has been pressed. When the call message to be given to Mr. A who uses the telephone number [2222] is recorded, the key 42 corresponding to the numeral "1" is pressed. When the call message to be given to Mr. B who uses the telephone number [3333] is recorded, the key 42 corresponding to the numeral "2" is pressed. With the key 42 corresponding to the numeral "1" or "2" is pressed, step Q3 is implemented to active the display 50 to provide a display "PICK UP HAND SET", to prompt the user to pick up the telephone hand set 12. Then, step Q4 is implemented to determine whether the hand set 12 has been picked up. If an affirmative decision (YES) is obtained in step Q4, the control flow goes to step Q5 in which the display 50 provides a display "MESSAGE UNDER RECORDING: 00/20", which means that a call message may be recorded through a microphone of the hand set 12. The "00" of the "00/20" indicates a time lapse in seconds after the start of the message recording, and the "/20" indicates that the maximum time of the call message that can be recorded is 20 seconds.

In this condition, the user speaks a desired call message to the microphone of the hand set 12, and the call message is recorded in the sub-area of the call message area of the audio DRAM 72, which corresponds to the registration number designated in step Q2. For instance, a call message "Mr. A, you have a phone call." is recorded in the call message sub-area corresponding to the registration number [1]. Step Q5 is followed by step Q6 to determine whether the hand set 12 has been returned in place. If an affirmative decision (YES) is obtained in step Q6, the control flow goes to step Q8 in which the display 50 provides a display "MESSAGE RECORDING COMPLETED". If a negative decision (NO) is obtained in step Q6, step Q7 is implemented to determine whether 20 seconds have passed. This determination is made on the basis of the clock pulses generated by the clock generator 38. Steps Q6 and Q7 are repeatedly implemented until the hand set 10 is returned or 20 seconds have passed. Step Q8 is also implemented when 20 seconds have passed.

If the key "7" labelled "SET" of the SELECTOR keys 46 is pressed while the display "MESSAGE RECORDING COMPLETED" is provided on the display 50, the routine of FIG. 12 is again executed to permit the user to record another call message. If the STOP key 52 is pressed after all call messages have been recorded, the system returns from the MESSAGE RECORDING mode to the normal telephone/facsimile communication mode.

In the present second embodiment, too, the reception processing routine of FIG. 7 is executed, and the D/R ON mode interruption routine of FIG. 8 is executed when the facsimile system 10 is placed in the D/R ON mode. In the present embodiment, however, step W9 is eliminated, and step W6 is directly followed by step W10 so that the ON and OFF times of the call signal CI are measured and stored in the RAM 28 until two long-OFF states are detected. Thus, the ON and OFF pattern of the call signal corresponding to one period is detected in the interruption routine of FIG. 8, and step R3 of FIG. 7 is implemented on the basis of the detected pattern of the received call signal. In step R3, the number of the ON and OFF times of one period of the received call signal which are stored in the RAM 28 in the interruption routine of FIG. 8 is compared with the numbers of the ON and OFF times of each of the three call signals which are stored in the EEPROM 70 in step S14 of the routine of FIGS. 4 and 5. If the number of the ON and OFF times stored in the RAM 28 is not equal to that of any of the three call signals whose patterns are stored in the EEPROM 70, the display 50 provides an indication that the pattern of the received call signal is different from the patterns of any call signals stored in the EEPROM 70. If the number of the ON and OFF times stored in the RAM 28 is equal to that of any call signal stored in the EEPROM 70, then the individual ON and OFF times stored in the RAM 28 are compared with those of that call signal in the EEPROM 70. If the ON and OFF times in the RAM 28 are the same as those of the call signal in question in the EEPROM 70, the display 50 provides an indication to that effect. If the pattern of the received call signal in the RAM 28 is the same as the pattern of the facsimile reception call signal, the display 50 provides an indication to that effect.

In step R4 following step R3, a determination is made as to whether the received call signal is found to have the facsimile reception pattern in step R3. If an affirmative decision (YES) is obtained in step R4, the control flow goes to step R5. If a negative decision (NO) is obtained in step R4, the control flow goes to step R4-1 indicated in the flow chart of FIG. 13. Thus, the present second embodiment is different from the first embodiment in which the control flow goes directly to step R6 if the negative decision (NO) is obtained in step R4. Step R4-1 is provided to determine whether the received call signal has the pattern other than the facsimile reception pattern, which is stored in the EEPROM 70. If a negative decision (NO) is obtained in step R4-1, the control flow goes to step R6 of FIG. 7. If an affirmative decision (YES) is obtained in step R4-1, step R4-2 is then implemented in which the call message corresponding to the received call signal is read out from the appropriate call message sub-area of the audio DRAM 72, and the speaker 26 is activated to provide the call message. In step R4-2, the call message stored in the call message sub-area at the registration number "1" of the audio DRAM 72 is generated if the received call signal has the pattern stored in the memory area at the registration number "1" of the EEPROM 70. Similarly, the call message stored in the call message sub-area at the registration number "2" of the audio DRAM 72 is generated if the received call signal has the pattern stored in the memory area at the registration number "2" of the EEPROM 70. Step R4-2 may be modified so that the call message and the ringing sound are generated alternately, or one after the other. Step R4-2 is followed by step R4-3 for manual reception processing so that the user called by the call message communicates with a calling party by picking up the hand set 12.

In the present embodiment, too, the D/R SET mode may be easily established by using the FUNCTION key 44 and the SELECTOR keys 46, so that the pattern of the call signal CI calling the facsimile reception telephone number and the patterns of the calls signals CI calling the telephone numbers used by Messrs. A and B are registered in the EEPROM 70. In this case, the call signals CI calling the respective telephone numbers are received from the telephone exchange company in response to calls from a remote telephone transmitter or facsimile transmitter. This procedure for registering the pattern of the call signals does not require the user to recognize the patterns of the received call signals while listening to the ringing sounds generated in response to the received call signals.

In the second embodiment described above, the EEPROM 70 functions as the pattern data memory for storing the pattern data representative of the patterns of the calls signals, and the FUNCTION key 44 and the SELECTOR keys 46 constitute the operator-controlled means for establishing the registering mode in which the pattern data can be stored in the pattern data memory 70. Further, portions of the CPU 24, RAM 28 and ROM 30 assigned to implement step S3 constitute the pattern detecting means for detecting the patterns of the call signals received while the facsimile system 10 is placed in the D/R SET mode or registering mode. It is also noted that portions of the CPU 24, RAM 28 and ROM 30 assigned to implement step S14 cooperate with the function and numeral keys 42 to constitute the pattern registering means operable in the registering mode (D/R SET mode), for registering the patterns of the call signals as detected by the pattern detecting means, in the pattern data memory 70 as the pattern data in relation to the corresponding telephone numbers. Further, portions of the CPU 24, RAM 28 and ROM 30 assigned to implement steps R3, R4 and R4-1 constitute the pattern determining means operable when the facsimile system is not placed in the registering mode, for comparing the pattern of the received call signal with each pattern stored in the pattern data memory, and thereby determining the telephone number being called by the received call signal.

The present second embodiment is adapted to store in the audio DRAM 72 the call messages corresponding to the call signals which call the telephone numbers used for telephone communication by respective users, so that the call messages are read out from the audio DRAM 72 and produced by the speaker 26 to vocally inform the users that they are receiving a telephone call. This arrangement permits the users to more easily recognize the reception of a telephone call at their telephone numbers, than the conventional arrangement in which only the ringing sound is generated according to the ON-OFF pattern of the call signal calling the specific telephone number. The present arrangement is convenient when a single facsimile system with a telephone hand set is used by two or more users.

There will next be described a third embodiment of this invention by reference to FIG. 14.

In this third embodiment, the RAM 28 stores the patterns of all the call signals CI available from a telephone exchange company, or some of those call signals which are typically used for the distinctive ringing service. In this specific example, the RAM 28 stores pattern data representative of the patterns indicated at (a) through (d) in FIG. 17, which have been described. Described more specifically, the RAM 28 stores data representative of the ON times and OFF times of the individual call signals. The pattern data of the call signals may be stored in the RAM 28 according to the routine illustrated in FIG. 6, for example.

Figure 14:
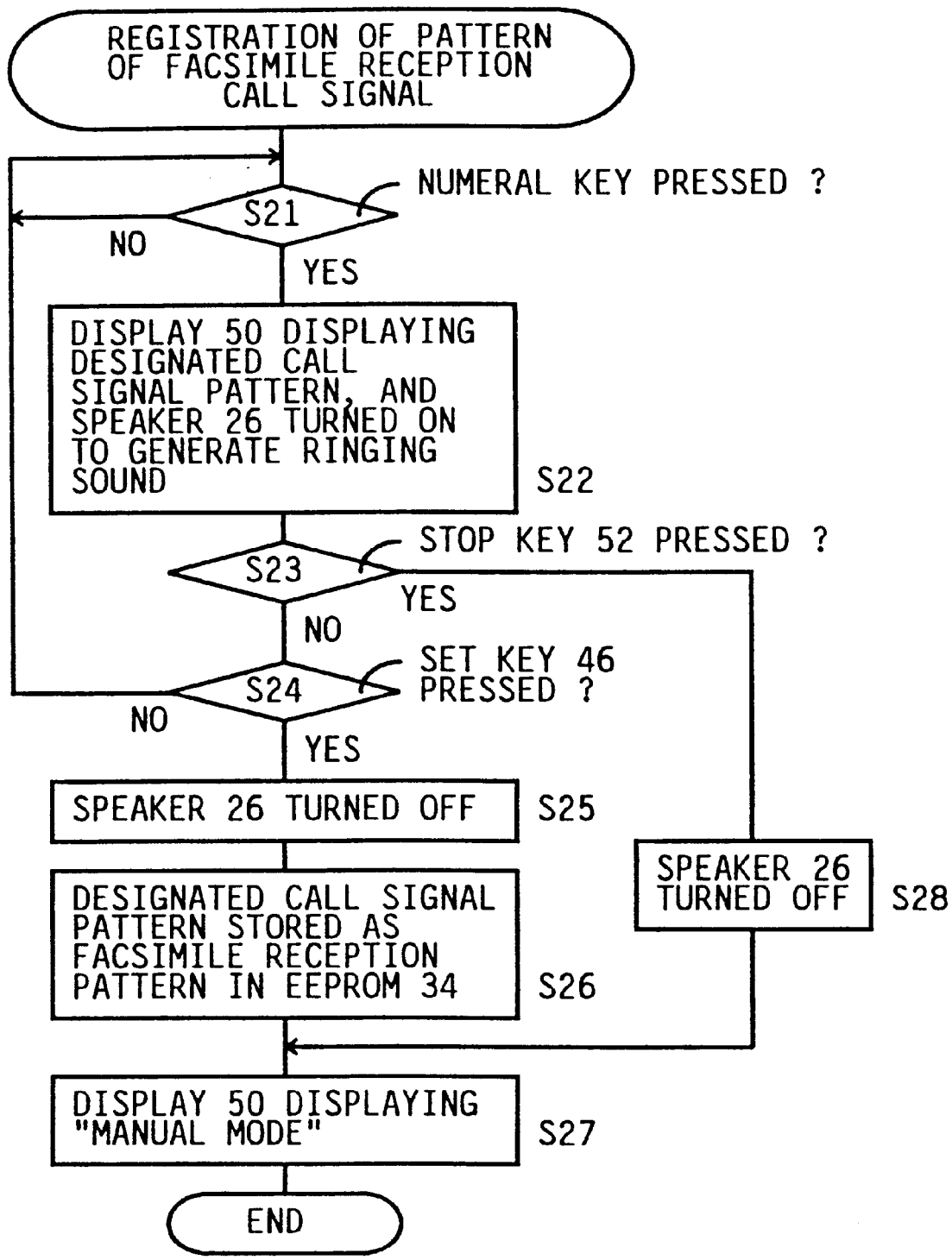
FIG. 14 is a flow chart illustrating a routine for registering the pattern of the facsimile reception call signal in a third embodiment of this invention.

The flow chart of FIG. 14 illustrates a routine for registering the pattern of the facsimile reception call signal in the present third embodiment. This routine is executed in the D/R SET mode which is established by the FUNCTION key 44 and the SELECTOR keys 46 as described above. The routine is initiated with step S21 to determine whether any of the numeral keys "1" through "4" of the SELECTOR keys 46 has been pressed. If an affirmative decision (YES) is obtained in step S21, the control flow goes to step S22 in which the display 50 provides an indication of the call signal designated by the numeral key "1", "2", "3" or "4", and the ON-times and OFF-times of the designated call signal are read out from the RAM 28, so that the ringing sound is generated by the speaker 26 according to the ON-times and OFF-times of the designated call signal. The numeral keys "1" through "4" of the SELECTOR keys 46 are assigned to designate the respective call signals indicated at (a) through (d) in FIG. 17. When these numeral keys "1" through "4" are pressed, the display 50 provides indications "1. STANDARD", "2. DOUBLE", "3. TRIPLE A" and "4. TRIPLE B", respectively, and the speaker 26 are activated to generate the ringing sounds according to the ON-OFF patterns as indicated at (a) through (d) in FIG. 17, respectively.

On the other hand, the speaker 26 is activated to generate the ringing sound when the call signal which calls the facsimile reception telephone number is received while the facsimile system 10 is placed in the D/R SET mode. When the ringing sound is generated in response to this facsimile reception call signal, one of the numeral keys "1" through "4" of the SELECTOR keys 46 is pressed to activate the speaker 26 to generate the corresponding ringing sound. That is, the ringing sound in response to the received facsimile reception call signal and the ringing sound according to the pattern data stored in the RAM 28 are both generated by the speaker 26, so that the user can easily determine whether the ringing sound generated by pressing one of the numeral keys "1" through "4" is the same as the ringing sound generated in response to the received call signal for the facsimile reception telephone number. It will be understood that the facsimile system 10 is automatically placed in the MANUAL reception mode when the system is placed in the D/R SET mode. It is noted that the ringing sound generated according to the received facsimile reception call signal and the ringing sound generated according to the pattern data stored in the RAM 28 have different frequencies, so that the user can distinguish these ringing sounds from each other.

Step S22 is followed by step S23 to determine whether the STOP key 52 has been pressed. If an affirmative decision (YES) is obtained in step S23, step S28 is implemented to turn off the speaker 26, and step S27 is then implemented. The STOP key 52 is pressed if the user finds out that the ringing sound generated according to the received call signal is not the same as any one of the ringing sounds generated upon pressing of the numeral keys "1" through "4" of the SELECTOR keys 46, that is, generated according to the call signal patterns stored in the RAM 28. In other words, the STOP key 52 is pressed if the call signal received does not have the facsimile reception pattern. If a negative decision (NO) is obtained in step S23, the control flow goes to step S24 to determine whether the numeral key "7" labelled "SET" of the SELECTOR keys 46 has been pressed. If a negative decision (NO) is obtained in step S24, the control flow returns to step S21, so that the user press another of the numeral keys "1" through "4" of the SELECTOR keys 46. In the following step S22, the call signal designated by the new numeral key is indicated on the display 50, and the speaker 26 is activated to generate the ringing sound according the call signal pattern stored in the RAM 28. In step S21, the numeral key "6" or "10" of the SELECTOR keys 46 which functions as the shift key can be used in place of the numeral keys "1" through "4", to change the call signal whose pattern data are used to activate the speaker 26 in step S22.

If the user finds out that the ringing sound generated according to the received call signal is the same as the ringing sound generated according to one of the call signal patterns stored in the RAM 28, the user presses the numeral key "7" labelled "SET" of the SELECTOR keys 46, and an affirmative decision (YES) is obtained in step S24, whereby step S25 is implemented to turn off the speaker 26. Step S25 is followed by step S26 in which the ON and OFF times of the call signal currently indicated on the display 50 are read out from the RAM 28 and stored in the EEPROM 32. At this time, the D/R SET mode is automatically changed to the D/R ON mode. Step S26 is followed by step S27 in which the display 50 provides an indication "MANUAL MODE", indicating that the facsimile system 10 is now placed in the MANUAL reception mode.

The facsimile reception pattern of the call signal thus registered in the EEPROM 32 is used in step R4 of the routine of FIG. 7 which is executed in the same manner as described above with respect to the first embodiment.

In the present third embodiment, the pattern of a call signal (e.g., facsimile reception call signal) is registered by performing the following steps: establishing the D/R SET mode by using the FUNCTION key 44 and the SELECTOR keys 46; receiving the facsimile reception call signal transmitted from a telephone exchange company in response to a call from a remote telephone or facsimile transmitter; pressing the appropriate one of the numeral keys "1" through "4" of the SELECTOR keys 46 while listening to the ringing sound generated from the speaker 26 according to the received call signal; and pressing the numeral key "7" labelled "SET" of the SELECTOR keys 46 if the ringing sound generated from the speaker 26 according to the pattern of one of the call signals which is stored in the RAM 28 and which is designated by the pressed one of the numeral keys "1" through "4" of the SELECTOR keys 46 is the same as the ringing sound generated according to the received call signal. Thus, the speaker 26 generates the two ringing sounds according to the received call signal and one of the calls signals stored in the RAM 28 which are selected or designated by the respective numeral keys "1" through "4" of the SELECTOR keys 46. The user listens to these two ringing sounds to determine whether the two sounds have the same ON-OFF pattern. The present arrangement facilitates the registration of the pattern of the facsimile reception call signal in the EEPROM 32.

In the present third embodiment, the RAM 28 functions as a first pattern data memory for storing pattern data representative of the patterns of the call signals which call the respective telephone numbers, and the EEPROM 32 functions as a second pattern data memory for storing pattern data representative of the facsimile reception call signal. Further, the FUNCTION key 44 and the SELECTOR keys 46 cooperate to constitute operator-controlled mode setting means for establishing a registering mode in the form of the D/R SET mode in which the pattern data of the pattern of the facsimile reception call signal are stored in the second pattern data memory 32. The numeral keys "1" through "4" of the SELECTOR keys 44 function as operator-controlled data input means for designating one of the patterns of the call signals stored in the first pattern data memory 28. It is also noted that portions of the CPU 24, RAM 28 and ROM 30 assigned to implement step S26 cooperate with the numeral key "7" labelled "SET" of the SELECTOR keys 46, to constitute pattern registering means operable in the registering mode, for registering the pattern designated by the operator-controlled data input means, in the second pattern data memory in relation to the corresponding telephone number. Further, portions of the CUP 24, RAM 28 and ROM 30 assigned to implement step S22 cooperate with sound generating means in the form of the speaker 26 to constitute pattern indicating means operable in the registering mode, for providing an indication of the patterns of the call signals stored in the first pattern data memory 28, more specifically, for generating the ringing sounds corresponding to those call signals. Portions of the CPU 24, RAM 28 and ROM 30 assigned to implement steps R3 and R4 of FIG. 7 and the interruption routine of FIG. 8 constitute pattern determining means which is operable when the facsimile system 10 is not placed in the registering mode (i.e., placed in one of the reception modes), for comparing the pattern of a currently received call signal with each of the patterns stored in the first pattern data memory, and thereby determining the telephone number being called by the call signal actually received.

Figure 15:
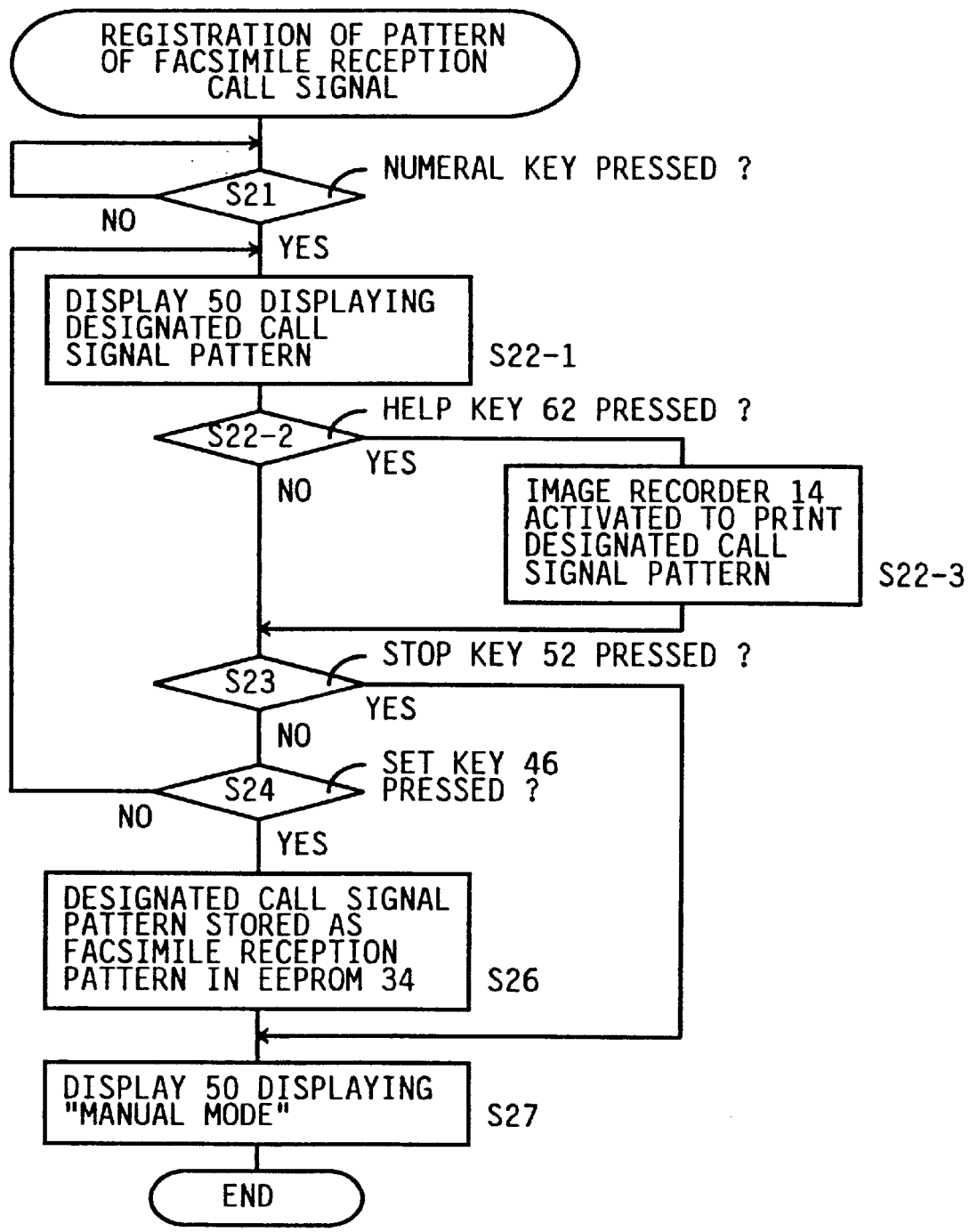
FIG. 15 is a flow chart corresponding to that of FIG. 14, showing a fourth embodiment of the invention.
Figure 16:
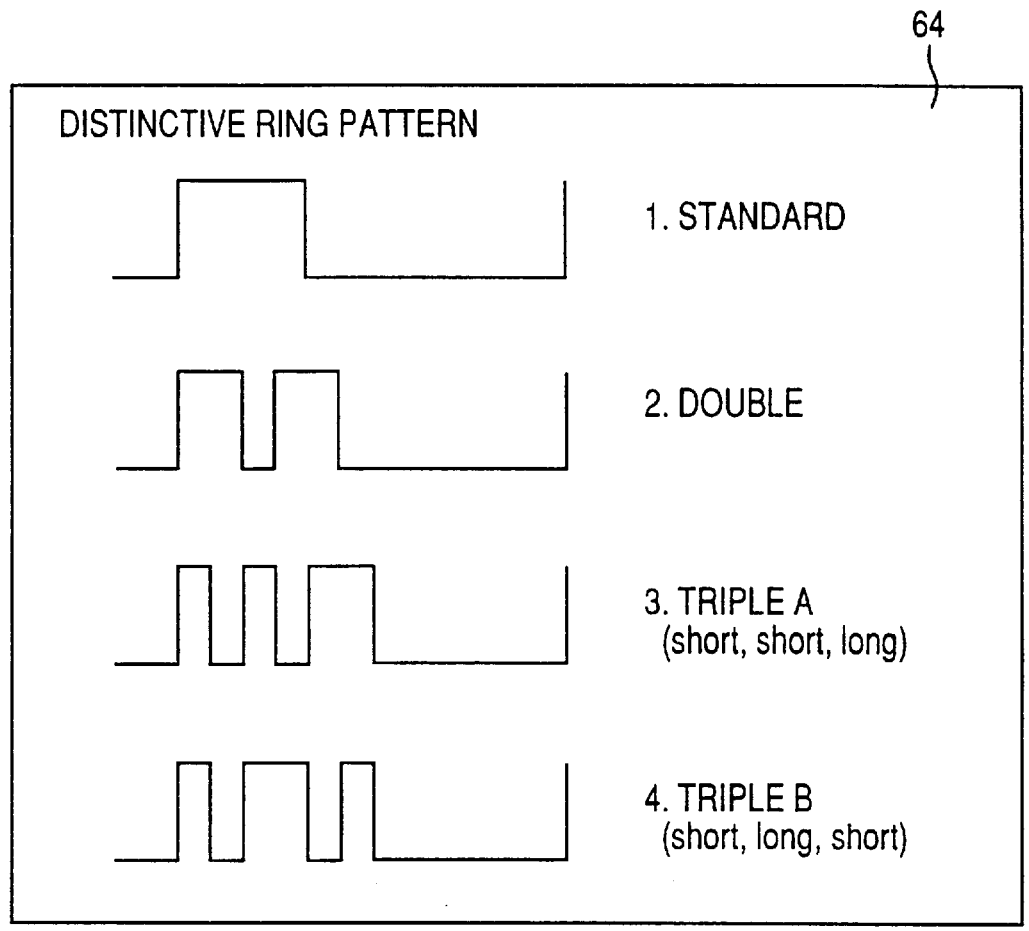
FIG. 16 is a view illustrating a hard copy of different patterns of call signals as printed by an image recorder of the facsimile system in the fourth embodiment.

Referring next to FIGS. 15 and 16, there will be described a fourth embodiment of the present invention.

The facsimile system 10 according to this fourth embodiment is adapted to execute a routine of FIG. 15 for registering the pattern of the facsimile reception call signal, in place of the routine of FIG. 14. As described below in detail, the routine of FIG. 15 is formulated to activate the image recorder 14 to produce a hard copy of the pattern of each of the call signals stored in the RAM 28, contrary to the third embodiment wherein the speaker 26 is activated to generate the ringing sound according to the designated call signal stored in the RAM 28.

The routine of FIG. 15 is initiated with step S21 described above with respect to the routine of FIG. 14. Step S21 is followed by steps S22-1, 22-2 and 22-3, which are substituted for step S22 in the routine of FIG. 14. In step S22-1, the display 50 provides one of the indications "1. STANDARD", "2. DOUBLE", "3. TRIPLE A" and "4. TRIPLE B", depending upon the key pressed in step S21. As in the routine of FIG. 14, the pattern of the call signal indicated on the display 50 is registered as the facsimile reception pattern in the EEPROM 32 in step S26 if the numeral key "7" labelled "SET of the SELECTOR keys 46 is pressed, that is, if the affirmative decision (YES) is obtained in step S24.

Step S22-1 is followed by step S22-2 to determine whether a HELP key 62 provided on the panel 40 has been pressed. If an affirmative decision (YES) is obtained in step S22-2, the control goes to step S22-3 in which the image recorder 14 is activated to produce a hard copy 64 as indicated in FIG. 16. The hard copy 64 is a printed sheet on which the ON-OFF patterns of the call signals stored in the RAM 28 are printed, together with the identifications of these call signals such as "1. STANDARD" for the call signal indicated at (a) in FIG. 17. The speaker 26 is operated on the basis of the pattern data stored in the RAM 28.

Thus, the present embodiment is adapted to provide the user with the hard copy 64, if the HELP key 62 is pressed. The hard copy 64 familiarizes the user with the specific patterns of the call signals which call the respective telephone numbers and which are stored in the RAM 28. The user observes this hard copy 64 when the user listens to the ringing sound generated according to the received facsimile reception call signal, so that the user correctly recognizes the ON-OFF pattern of the received call signal. In the present fourth embodiment, portions of the CPU 24, RAM 28 AND ROM 30 assigned to implement steps S22-2 and S22-3 cooperate with recording means in the form of the image recorder 14 to constitute pattern indicating means for indicating the ON-OFF patterns (ON times and OFF times) of the call signals in the form of the hard copy 64. The HELP key 62 functions as operator-controlled means for activating the image recorder 14 to produce the hard copy 64.

While the present invention has been described in detail in its presently preferred embodiments, it is to be understood that the invention may be otherwise embodied.

Although the illustrated embodiments take the form of a facsimile system having a facsimile transmitter and a facsimile receiver as well as the telephone hand set 12, the principle of the present invention is equally applicable to a telephone set of distinctive ringing type without facsimile transmitter and receiver, wherein the patterns of call signals calling different telephone numbers are registered for different automatic processing operations upon reception of the call signals, as in the second embodiment.

While the FUNCTION key 44 and the SELECTOR keys 46 are used to change the D/R mode (to select one of the D/R ON, D/R OFF and D/R SET modes), a single key may be used to change the D/R mode, like the MODE key 48 is used to select one of the reception modes (AUTO, F/T, MANUAL and TAD).

Although the routine of FIG. 4 to register the facsimile reception pattern of the call signal is adapted to require the user to pick up the hand set 12 or press the HOOK key 54 and press the START key 56, the routine of FIG. 4 may be suitably modified. For example, the registration may be effected without any key operation or by using a single key.

In the illustrated first and second embodiments, the ON and OFF times of the call signal are measured to register the pattern of the signal by using the counters C(ON) and C(OFF). However, the ON and OFF times may be measured by using the clock pulses generated by the clock generator 38.

While the illustrated first and second embodiments use the routine of FIGS. 4–5 for registering the pattern or patterns of the call signal or signals and the separate reception processing routine of FIG. 7, these routines may be integrated into a single routine, which may be formulated such that the determination as to whether the D/R OFF mode is selected is effected following step S1, and steps S3, S4 and S9 are repeatedly implemented to detect the pattern of the received call signal CI if the D/R OFF mode is not selected, and such that steps S5–S16 are implemented to register the call signal patterns if the D/R SET mode is selected, or steps R3–R12 are implemented for effecting reception processing if the D/R ON mode is selected.

In the second embodiment, different call messages are generated depending upon the telephone numbers called by the respective call signals. However, the call messages may be replaced by ringing sounds which are clearly distinct from each other to the listeners, or an indication of the called telephone number or the recipient of a phone call on the display 50.

While the EEPROM 70 used in the second embodiment has three memory areas for storing the patterns of the call signals other than the facsimile reception call signal, the number of such memory areas may be suitably changed. Further, the EEPROM 70 and audio DRAM 72 may be replaced by other data storage media or memory means.

In the routine of FIGS. 4 and 5, the pattern of the call signal stored in the RAM 28 is registered as the facsimile reception pattern in the EEPROM 32 (step S14) immediately after the START key 56 is pressed (step S13). If any pattern has already been stored in the EEPROM 32, the new pattern stored in the RAM 28 is substituted for the pattern already stored in the EEPROM 32. However, step S14 may be preceded by a step to ask the user as to whether the already stored pattern should be replaced by the new pattern, or a step to inform the user by an alarm sound or voice message that the facsimile reception pattern is already stored in the EEPROM 32, and a step in which the START key 56 or other key is pressed to replace the old pattern by the new pattern. Similar modifications are possible with respect to the registration of the call signal patterns and the recording of the call messages in the routines of FIGS. 11 and 12, and also the registration of the facsimile reception call signal pattern in the third and fourth embodiments of FIGS. 14 and 15.

In the third and fourth embodiments, one of the four call signals stored in the RAM 28 is selected as the facsimile reception call signal. However, the number and the patterns of the call signals stored in the RAM 28 may be suitably changed. Suitable operator-controlled means may be provided to change the already stored call signal patterns or enter new call signal patterns, according to the call signal patterns available from a telephone exchange company.

While step S22 of the third embodiment of FIG. 14 is formulated to automatically activate the speaker 26 to generate the ringing sound, it is possible that the speaker 26 is activated only when the HELP key 62 is pressed, like the image recorder 14 which is activated only when the HELP key 62 is pressed in the fourth embodiment. In the third embodiment, the ringing sound corresponding to the call signal designated by the key pressed in step S21 is generated in step S22, the ringing sounds corresponding to all the call signals stored in the RAM 28 may be generated, one after another in a predetermined order, at a predetermined time interval.

Although step S22-3 of the fourth embodiment of FIG. 15 is adapted to produce the hard copy 64, the display 50 may provide an indication of the ON-OFF pattern of the call signal designated in step S21, or indications of the ON-OFF patterns of all the call signals stored in the RAM 28.

It is to be understood that the present invention may be embodied with various other changes, modifications and improvements, which may occur to those skilled in the art without departing from the spirit and scope of the invention defined in the following claims.

What is claimed is:

1. A telephone set incorporated in a facsimile system of distinctive ringing type of a called party capable of effecting selective facsimile and telephone communications with a remote calling party calling one of a plurality of telephone numbers of said telephone set, said plurality of telephone numbers being called by respective call signals having respective different patterns, said call signals including at least one facsimile call signal calling at least one facsimile reception telephone number for said facsimile communication, and at least one telephone call signal calling at least one telephone communication telephone number of said telephone communication, said telephone set comprising:

a pattern data memory for storing pattern data representative of the pattern of each of said at least one facsimile call signal and said at least one telephone call signal;

sound generating means for providing audible indications of said plurality of telephone numbers called by said respective call signals;

operator-controlled means for establishing a registering mode in which said pattern data representative of the patterns of said at least one facsimile call signal and said at least one telephone call signal are stored in said pattern data memory, a distinctive ringing ON mode and a distinctive ringing OFF mode;

pattern detecting means for detecting the patterns of said at least one facsimile call signal and said at least one telephone call signal when said at least one facsimile call signal and said at least one telephone call signal are received while the telephone set is placed in said registering mode;

pattern registering means, operable in said registering mode, for registering the pattern of each of said at least one facsimile call signal is detected by said pattern detecting means, in said pattern data memory as said pattern data in relation to the corresponding one of said at least one facsimile communication telephone number, said pattern registering means registering each of said at least one telephone call signal as detected by said pattern detecting means, in said pattern data memory as said pattern data in relation to the corresponding one of said at least one telephone communication telephone number;

pattern determining means, operable when said telephone set is placed in said distinctive ringing ON mode, for comparing the pattern of a call signal which is currently received with each pattern represented by said pattern data stored in said pattern data memory, and thereby determining the telephone number being called by the received call signal; and selective call signal processing means for initiating the facsimile communication with said remote calling party, without activating said sound generating means, if said pattern determining means determines that said call signal currently received in said distinctive ringing ON mode is one of said at least one facsimile call signal;

said selective call signal processing means inhibiting an operation of said pattern determining means in said distinctive ringing OFF mode.

2. A telephone set incorporated in a facsimile system according to claim 1, wherein said selective call signal processing means activates said sound generating means, if said pattern determining means determines that said call signal currently received in said distinctive ringing ON mode is not one of said at least one facsimile call signal, so that the audible indication of the telephone number called by said call signal currently received is generated by said sound generating means.

3. A telephone set incorporated in a facsimile system according to claim 1, wherein said selective call signal processing means has an auto reception mode which is selectable if said call signal currently received in said distinctive ringing ON mode is not one of said at least one facsimile call signal, said selective call signal processing means activating said sound generating means, in said auto reception mode, according to said call signal which is not one of said at least one facsimile call signal, and then initiating the facsimile communication with said remote calling party.

4. A telephone set incorporated in a facsimile system according to claim 1, wherein said selective call signal processing means has a manual reception mode which is selectable in said distinctive ringing OFF mode, said selective call signal processing means activating said sound generating means, in said manual reception mode, according to said call signal currently received.

5. A telephone set incorporated in a facsimile system according to claim 1, wherein said sound generating means comprises ringing means for generating ringing sounds having respective patterns corresponding to the patterns of said respective call signals.

6. A telephone set incorporated in a facsimile system according to claim 1, wherein said sound generating means comprises message generating means for generating call messages indicating said plurality of telephone numbers, respectively.

* * * * *